(12) United States Patent
LaRue

(10) Patent No.: US 6,587,853 B1
(45) Date of Patent: Jul. 1, 2003

(54) SYSTEM THAT EMPLOYS INFERENCING FOR TROUBLESHOOTING COMPLEX USER AUTHENTICATION PROBLEMS

(75) Inventor: Daniel V. LaRue, Newbury, MA (US)

(73) Assignee: Plum Software Associates, Inc., Newbury, MA (US)

(*) Notice: Subject to any disclaimer, the term of this patent is extended or adjusted under 35 U.S.C. 154(b) by 0 days.

(21) Appl. No.: 09/574,628

(22) Filed: May 19, 2000

Related U.S. Application Data

(60) Provisional application No. 60/134,921, filed on May 19, 1999.

(51) Int. Cl.[7] ............................. G06F 17/30; G06F 7/00
(52) U.S. Cl. ............................................................ 707/9
(58) Field of Search .................................. 713/200–202, 713/185, 182; 709/229; 707/9, 1, 3, 10; 706/8, 46, 45, 47, 60

(56) References Cited

U.S. PATENT DOCUMENTS

| | | | | |
|---|---|---|---|---|
| 5,581,664 A | * | 12/1996 | Allen et al. ................... 706/46 |
| 5,611,048 A | * | 3/1997 | Jacobs et al. ................ 713/202 |
| 5,701,399 A | * | 12/1997 | Lee et al. ..................... 706/11 |
| 5,852,814 A | * | 12/1998 | Allen ........................... 706/13 |
| 6,067,625 A | * | 5/2000 | Ryu .............................. 713/202 |
| 6,185,682 B1 | * | 2/2001 | Tang ............................. 713/168 |
| 6,246,997 B1 | * | 6/2001 | Cybul et al. .................. 705/27 |
| 6,292,904 B1 | * | 9/2001 | Broomhall et al. ............ 714/1 |
| 6,327,579 B1 | * | 12/2001 | Crawford ..................... 705/400 |
| 6,345,361 B1 | * | 2/2002 | Jerger et al. ................. 713/200 |
| 6,353,446 B1 | * | 3/2002 | Vaughn et al. ............... 345/733 |
| 6,477,531 B1 | * | 11/2002 | Sullivan et al. .............. 707/10 |

* cited by examiner

Primary Examiner—Greta Robinson
Assistant Examiner—Susan Rayyan
(74) Attorney, Agent, or Firm—Gordon E. Nelson

(57) ABSTRACT

A system that uses inferencing to deal with complex authentication problems such as those that occur when users authenticate themselves by means of tokens. A troubleshooter responds to a user's request for help by inputting an identification code for the user's token into the system. The system uses the identification code to obtain the current authentication state for the token from an authentication database and then inputs the authentication state to an inferencing system such as a knowledge base. The inferencing system uses the authentication state to make inferences concerning the problem. The inferencing process may involve obtaining further information from the troubleshooter an/or the authentication database and may also provide warnings of particular security problems to the troubleshooter. Eventually, the inferencing system reaches a solution, which may include advice that the troubleshooter is to give to the user. The solution may also involve a modification to the authentication database. When that is the case, an indication from the troubleshooter that the system is to modify the database causes the system to automatically perform the modification. In a preferred embodiment, communication between the troubleshooter and the system is via World Wide Web protocols.

13 Claims, 35 Drawing Sheets

| Authentication States |
|---|
| Token is enabled |
| Token is expired |
| Token is in new PIN mode |
| Token Type |
| Token PIN is cleared |
| Token in next tokencode mode |
| Token number of bad tokencode tries |
| Token number of bad PIN tries |
| Token is assigned |
| Token is in emergency access mode |
| Token days since last log in |
| User expired |
| Authentication client machine type |

FIG 18

| Possible Solutions |
| --- |
| Synchronize token |
| Clear the bad PIN and tokencode counts |
| Set token new PIN mode |
| Set token emergency access mode |
| Clear token emergency access mode |
| Do not help user, he is unauthorized |
| Escalate to an administrator, token is expired |
| Escalate to an administrator, user is expired |
| Escalate to an administrator, token intentionally disabled |
| Instruct user on proper PIN and tokencode entry for standard type token |
| Instruct user on proper PIN and tokencode entry for PINPAD type token |
| Instruct user on set new PIN mode entry |
| Instruct user on next tokencode mode entry |
| In next tokencode mode, try again |
| User tried logging in with the wrong user ID |
| Nothing appears to be wrong try again |
| Escalate to an administrator the user is not assigned to the proper client machine |
| Client machine does not support new PIN mode |
| Client machine does not support next tokencode mode |
| User is having lots of problems or he is a hacker, escalate to an administrator |
| Unable to detect a problem, escalate to an administrator |

FIG 19

```
       (defrule ask-forgot-pin
          ?userQuery <- (userQuery (knowsPin unknown))
          (exToken (pinGuessing ?pg))
          (token (newPin ?np) (clearPin FALSE))
          (test (or (eq ?pg yes) (eq ?np TRUE)))
          (userQuery (hasToken yes))
          ?control <- (control (phase query) (loopExit ?x))
          =>
2002 ──   (bind ?*question* (fetch QUESTION))
2004 ──   (call ?*question* setKey "ask-forgot-pin")
2006 ──   (call ?*question* addResponseKey "yes")
2008 ──   (call ?*question* addResponseKey "no")
2010 ──   (bind ?response (eval (call ?*question* ask)))
2012 ──   (modify ?userQuery (knowsPin ?response))
          (modify ?control (phase isolate) (loopExit no))
          )
```

FIG. 20

```
;(unwatch compilations)
;(watch rules)
;(watch facts)

;*****************************************************
; Globals
;*****************************************************

(defglobal
  ?*question* = nil
)

;*****************************************************-
;******System facts*********
;*****************************************************-
(defclass token jess.examples.help.Psa_Token_Fact)
(defclass user jess.examples.help.Psa_User_Fact)
(defclass client jess.examples.help.Psa_Client_Fact)
(defclass log jess.examples.help.Psa_Log_Fact)

(deftemplate exToken
   (slot pinGuessing
      (type SYMBOL)
;     (allowed-symbols yes no unknown)
      (default unknown)
      )
   (slot passcodeGuessing
      (type SYMBOL)
;     (allowed-symbols yes no unknown)
      (default unknown)
      )
   (slot pinStolen
      (type SYMBOL)
;     (allowed-symbols yes no unknown)
      (default unknown)
      )
   (slot noProblemDetected
      (type SYMBOL)
;     (allowed-symbols yes no unknown)
      (default unknown);
      )
   )

;*********Session Facts*****
(deftemplate session
   (slot solution
      (type SYMBOL)
;     (allowed-symbols yes no unknown)
      (default unknown);
      )
   )

;******Case Facts******
(deftemplate lastCall
   (slot solution
```

FIG. 21A

```
        (type SYMBOL)
;       (allowed-symbols nil)
        )
    )

;******Query Facts*******
(deftemplate userQuery
    (slot symptom
        (type SYMBOL)
;       (allowed-symbols unknown query)
        (default unknown)
        )
    (slot dontKnow
        (type SYMBOL)
;       (allowed-symbols unknown query)
        (default unknown)
        )
    (slot beenQueried
        (type SYMBOL)
;       (allowed-symbols yes no unknown)
        (default unknown)
        )
    (slot hasToken
        (type SYMBOL)
;       (allowed-symbols yes no unknown query)
        (default unknown)
        )
    (slot knowsPin
        (type SYMBOL)
;       (allowed-symbols yes no unknown query)
        (default unknown)
        )
    (slot knowsClearPin
        (type SYMBOL)
;       (allowed-symbols yes no unknown query instructed)
        (default unknown)
        )
    (slot knowsNewPin
        (type SYMBOL)
;       (allowed-symbols yes no unknown query instructed)
        (default unknown)
        )
    (slot knowsLoginName
        (type SYMBOL)
;       (allowed-symbols yes no unknown query instructed)
        (default unknown)
        )
    (slot knowsPasscodeEntry
        (type SYMBOL)
;       (allowed-symbols yes no unknown query instructed)
        (default unknown)
        )
    (slot knowsNextTokencode
        (type SYMBOL)
;       (allowed-symbols yes no unknown query instructed)
```

FIG. 21B

```
      (default unknown)
    )
 )

; ************************************************---
; facts with certainty
; ************************************************---

(deffacts facts-with-certainty
  (cfact synced 0.0)
  )

; ************************************************---
; certainty combining rules
; ************************************************---

(defrule combine-certainty-both-positive
   (declare  (salience 10))
   ?combine <- (cfact ?name ?cf1 ?cf2)
   (test (and (>= ?cf1 0)(>= ?cf1 0)))
   =>
   (bind ?cf3 (- (+ ?cf1 ?cf2) (* ?cf1 ?cf2)))
   (retract ?combine)
   (assert (cfact ?name ?cf3))
   )

(defrule combine-certainty-both-negative
   (declare  (salience 10))
   ?combine <- (cfact ?name ?cf1 ?cf2&:(and (< ?cf1 0)(< ?cf1 0)))
   =>
   (bind ?cf3 (+ (+ ?cf1 ?cf2) (* ?cf1 ?cf2)))
   (retract ?combine)
   (assert (cfact ?name ?cf3))
   )

(defrule combine-certainty-one-positive-one-negative
   (declare  (salience 10))
   ?combine <- (cfact ?name ?cf1 ?cf2&:(< (* ?cf1 ?cf2) 0))
   =>
   (bind ?cf3 (/ (+ ?cf1 ?cf2) (- 1(min (abs ?cf1) (abs ?cf2)))))
   (retract ?combine)
   (assert (cfact ?name ?cf3))
   )

; ************************************************---
; phase control facts
; ************************************************---

(deftemplate control
   (slot phase
      (type SYMBOL)
;     (allowed-symbols initial query constrain isolate finish)
      (default isolate)
```

FIG. 21C

```
      )
    (slot count
      (type INTEGER)
      (default 0)
      )
    (multislot loop
;      (type SYMBOL)
;      (default query constrain isolate)
      )
    (slot loopExit
      (type SYMBOL)
;      (allowed-symbols yes)
      (default no)
      )
  )

; ******************************************---
; phase control rules
; ******************************************---

(defrule change-phase
  (declare  (salience -10))
  ?phase <- (control (phase ?current-phase))
  ?list <- (control (loop ?next-phase $?other-phases))
  ?count <- (control (count ?i))
  (test (<= ?i 100))
  (control (loopExit no))
  =>
  ;(printout t "--Phase is " ?next-phase ?i" --" crlf)
  (retract ?phase ?list ?count)
  (assert (control (count (+ ?i 1))(phase ?next-phase) (loop
?other-phases
?next-phase)))
  )

; *******************************************
; function definitions
; *******************************************
(deffunction ask-question ()
  (call ?*question* ask))

; *******************************************---
; main rules
; *******************************************---

;****initial query********************-
(defrule ask-user-symptom
  ?userQuery <- (userQuery (symptom unknown) (dontKnow unknown)
(beenQueried
~yes))
  ?control <- (control (phase initial) (loopExit ?x))
  =>
  (bind ?*question* (fetch QUESTION))
  (call ?*question* setKey "opening-statement")
  (call ?*question* addResponseKey "cant-get-in")
```

FIG. 21D

```
    (call ?*question* addResponseKey "lost-token")
    (call ?*question* addResponseKey "found-token")
    (call ?*question* addResponseKey "unknown")
    (bind ?response1 (eval (call ?*question* ask)))
;
    (bind ?*question* (fetch QUESTION))
    (call ?*question* setKey "user-doesnt-know")
    (call ?*question* addResponseKey "unknown")
    (call ?*question* addResponseKey "pin")
    (call ?*question* addResponseKey "login-name")
    (call ?*question* addResponseKey "new-pin-mode")
    (call ?*question* addResponseKey "next-tokencode-mode")
    (call ?*question* addResponseKey "passcode-entry")
    (modify ?control (phase constrain) (loopExit no))
    (bind ?response2 (eval (call ?*question* ask)))
    (modify ?userQuery (dontKnow ?response2) (symptom ?response1)
(beenQueried
yes))
    )

(defrule user-symptom-pin
    ?userQuery <- (userQuery (dontKnow pin) (beenQueried yes))
    ?control <- (control (phase constrain) (loopExit ?x))
    =>
    (modify ?control (phase constrain) (loopExit no))
    (modify ?userQuery (knowsPin no))
    )

(defrule user-symptom-login
    ?userQuery <- (userQuery (dontKnow login-name) (beenQueried
yes))
    ?control <- (control (phase constrain) (loopExit ?x))
    =>
    (modify ?control (phase isolate) (loopExit no))
    (modify ?userQuery (knowsLoginName no))
    )

(defrule user-symptom-new-pin
    ?userQuery <- (userQuery (dontKnow new-pin-mode) (beenQueried
yes))
    ?control <- (control (phase constrain) (loopExit ?x))
    =>
    (modify ?control (phase isolate) (loopExit no))
    (modify ?userQuery (knowsNewPin no) (knowsClearPin no))
    )

(defrule user-symptom-next-tokencode
    ?userQuery <- (userQuery (dontKnow next-tokencode-mode)
(beenQueried yes))
    ?control <- (control (phase constrain) (loopExit ?x))
    =>
    (modify ?control (phase isolate) (loopExit no))
    (modify ?userQuery (knowsNextTokencode no))
    )
```

FIG. 21E

```
(defrule user-symptom-passcode
  ?userQuery <- (userQuery (dontKnow passcode-entry)
(beenQueried yes))
  ?control <- (control (phase constrain) (loopExit ?x))
  =>
  (modify ?control (phase isolate) (loopExit no))
  (modify ?userQuery (knowsPasscodeEntry no))
  )

;****simple token problems**********************
(defrule token-just-disabled
  (userQuery (dontKnow unknown))
  (token (enabled FALSE) (badPins FALSE) (badTokencodes FALSE))
  ?control <- (control (phase isolate) (loopExit ?x))
  =>
  (bind ?*question* (fetch QUESTION))
  (call ?*question* setKey "token-just-disabled")
  (call ?*question* addResponseKey "ok")
  (call ?*question* solution)
  (modify ?control (phase finish) (loopExit yes))
  )

(defrule token-just-expired-single
  (token (expired TRUE))
  (client (multipleTransaction FALSE))
  ?control <- (control (phase isolate) (loopExit ?x))
  =>
  (bind ?*question* (fetch QUESTION))
  (call ?*question* setKey "token-just-expired-single")
  (call ?*question* addResponseKey "ok")
  (call ?*question* solution)
  (modify ?control (phase finish) (loopExit yes))
  )

(defrule token-just-expired-multi
  (token (expired TRUE))
  (client (multipleTransaction TRUE))
  ?control <- (control (phase isolate) (loopExit ?x))
  =>
  (bind ?*question* (fetch QUESTION))
  (call ?*question* setKey "token-just-expired-multi")
  (call ?*question* addResponseKey "ok")
  (call ?*question* solution)
  (modify ?control (phase finish) (loopExit yes))
  )

(defrule token-not-assigned
  (token (assigned FALSE))
  ?control <- (control (phase isolate) (loopExit ?x))
  =>
  (bind ?*question* (fetch QUESTION))
  (call ?*question* setKey "token-not-assigned")
  (call ?*question* addResponseKey "ok")
  (call ?*question* solution)
  (modify ?control (phase finish) (loopExit yes))
```
FIG. 21F

```
)

;****simple user problems***********************
(defrule user-expired
  (user (expired TRUE))
  ?control <- (control (phase isolate) (loopExit ?x))
  =>
  (bind ?*question* (fetch QUESTION))
  (call ?*question* setKey "user-expired")
  (call ?*question* addResponseKey "ok")
  (call ?*question* solution)
  (modify ?control (phase finish) (loopExit yes))
)

;****pin problems*******************
(defrule pin-guessing-advise
  ?exToken <- (exToken (pinGuessing unknown) (passcodeGuessing
?pcg))
  (token (newPin FALSE) (type ?typ) (badPins ?bp))
  (userQuery (knowsPasscodeEntry ?kpe))
  (test (or (and (eq ?typ "standard") (eq ?bp TRUE))
            (and (or (eq ?typ "pin-pad") (eq ?typ "soft"))
                 (eq ?kpe yes))))
  ?control <- (control (phase isolate) (loopExit ?x))
  =>
  (modify ?exToken (pinGuessing yes))
  (bind ?*question* (fetch QUESTION))
  (call ?*question* setKey "pin-guessing-advise")
  (call ?*question* addResponseKey "ok")
  (call ?*question* ask)
  (modify ?control (phase query) (loopExit no))
)

(defrule ask-forgot-pin
  ?userQuery <- (userQuery (knowsPin unknown))
  (exToken (pinGuessing ?pg))
  (token (newPin ?np) (clearPin FALSE))
  (test (or (eq ?pg yes) (eq ?np TRUE)))
  (userQuery (hasToken yes))
  ?control <- (control (phase query) (loopExit ?x))
  =>
  (bind ?*question* (fetch QUESTION))
  (call ?*question* setKey "ask-forgot-pin")
  (call ?*question* addResponseKey "yes")
  (call ?*question* addResponseKey "no")
  (bind ?response (eval (call ?*question* ask)))
  (modify ?userQuery (knowsPin ?response))
  (modify ?control (phase isolate) (loopExit no))
)

(defrule disabled-pin-guessing
  (userQuery (knowsPin ~unknown))
  ?session <- (session (solution ?y))
  ?token <- (token (enabled FALSE)(newPin ?np))
  (exToken (pinGuessing ?pg))
```

FIG. 21G

```
   (test (or (eq ?pg yes) (eq ?np TRUE)))
   ?control <- (control (phase isolate) (loopExit ?x))
   =>
   (bind ?*question* (fetch QUESTION))
   (call ?*question* setKey "disabled-pin-guessing")
   (call ?*question* addResponseKey "ok")
   (call ?*question* fix)
   (modify ?token (enabled TRUE) (nextTokencode FALSE) (badPins
TRUE)
(badTokencodes FALSE))
   (modify ?session (solution yes))
   )

(defrule set-pin-single
   (userQuery (knowsPin ?kp))
   (exToken (pinStolen ?ps))
   (token (clearPin ?cp) (newPin ?np))
   (test (or (eq ?kp no) (eq ?ps yes) (eq ?cp TRUE) (eq ?np
TRUE)))
   (client (multipleTransaction FALSE))
   ?control <- (control (phase isolate) (loopExit ?x))
   =>
   (bind ?*question* (fetch QUESTION))
   (call ?*question* setKey "set-pin-single")
   (call ?*question* addResponseKey "ok")
   (call ?*question* solution)
   (modify ?control (phase finish) (loopExit yes))
   )

(defrule user-forgot-pin-multi
   (userQuery (knowsPin ?kp))
   ?session <- (session (solution ?y))
   (exToken (pinStolen ?ps))
   (test (or (eq ?kp no) (eq ?ps yes)))
   (client (multipleTransaction TRUE))
   ?token <- (token (clearPin FALSE))
   ?control <- (control (phase isolate) (loopExit ?x))
   =>
   (bind ?*question* (fetch QUESTION))
   (call ?*question* setKey "user-forgot-pin-multi")
   (call ?*question* addResponseKey "ok")
   (call ?*question* ask)
   (modify ?token (clearPin TRUE))
   (modify ?session (solution yes))
   )

;****new pin*******************************---
(defrule ask-user-new-pin
   ?userQuery <- (userQuery (dontKnow unknown) (knowsNewPin
unknown)
(knowsPin yes))
   (client (multipleTransaction TRUE))
   (token (newPin TRUE))
   ?control <- (control (phase isolate) (loopExit ?x))
   =>
```

FIG. 21H

```
   (bind ?*question* (fetch QUESTION))
   (call ?*question* setKey "ask-user-new-pin")
   (call ?*question* addResponseKey "yes")
   (call ?*question* addResponseKey "no")
   (bind ?response (eval (call ?*question* ask)))
   (modify ?userQuery (knowsNewPin ?response))
   )

(defrule instruct-new-pin
   ?userQuery <- (userQuery (knowsNewPin no))
   (token (newPin TRUE))
   (client (multipleTransaction TRUE))
   ?control <- (control (phase isolate) (loopExit ?x))
   =>
   (bind ?*question* (fetch QUESTION))
   (call ?*question* setKey "instruct-new-pin")
   (call ?*question* addResponseKey "ok")
   (call ?*question* ask)
   (modify ?userQuery (knowsNewPin instructed))
   )

;****next tokencode**************************
(defrule passcode-guessing
   ?exToken <- (exToken (passcodeGuessing unknown))
   (token (clearPin FALSE) (nextTokencode TRUE))
   ?control <- (control (phase isolate) (loopExit ?x))
   =>
   (modify ?control (phase query) (loopExit no))
   (modify ?exToken (passcodeGuessing yes))
   )

(defrule ask-passcode-entry
   ?userQuery <- (userQuery (knowsPasscodeEntry unknown)
(knowsPin ?kp))
   (exToken (passcodeGuessing ?pcg) (pinGuessing ?pg))
   (token (clearPin FALSE) (badTokencodes ?bt))
   (test (or (eq ?pcg yes) (eq ?bt TRUE) (and (eq ?pg yes) (eq
?kp yes))))
   ?control <- (control (phase query) (loopExit ?x))
   =>
   (bind ?*question* (fetch QUESTION))
   (call ?*question* setKey "ask-passcode-entry")
   (call ?*question* addResponseKey "yes")
   (call ?*question* addResponseKey "no")
   (modify ?control (phase isolate) (loopExit no))
   (bind ?response (eval (call ?*question* ask)))
   (modify ?userQuery (knowsPasscodeEntry ?response))
   )

(defrule instruct-passcode
   ?userQuery <- (userQuery (knowsPasscodeEntry no))
   ?control <- (control (phase isolate) (loopExit ?x))
   =>
   (bind ?*question* (fetch QUESTION))
   (call ?*question* setKey "instruct-passcode")
```

FIG. 21I

```
    (call ?*question* addResponseKey "ok")
    (call ?*question* ask)
    (modify ?userQuery (knowsPasscodeEntry instructed))
)

(defrule ask-next-tokencode
  ?userQuery <- (userQuery (knowsNextTokencode unknown)
(knowsPasscodeEntry
?kpe)
                  (knowsPin ?kp))
  (client (multipleTransaction TRUE))
  (exToken (passcodeGuessing ?pcg) (pinGuessing ?pg))
  (test (or
            (and (eq ?pcg yes) (or (eq ?kpe yes) (eq ?kpe
instructed)))
            (and (eq ?pg yes) (eq ?kp yes))))
  ?control <- (control (phase query) (loopExit ?x))
  =>
  (bind ?*question* (fetch QUESTION))
  (call ?*question* setKey "ask-next-tokencode")
  (call ?*question* addResponseKey "yes")
  (call ?*question* addResponseKey "no")
  (modify ?control (phase isolate) (loopExit no))
  (bind ?response (eval (call ?*question* ask)))
  (modify ?userQuery (knowsNextTokencode ?response))
)

(defrule instruct-next-tokencode
  ?userQuery <- (userQuery (knowsNextTokencode no))
  ?control <- (control (phase isolate) (loopExit ?x))
  =>
  (bind ?*question* (fetch QUESTION))
  (call ?*question* setKey "instruct-next-tokencode")
  (call ?*question* addResponseKey "ok")
  (call ?*question* ask)
  (modify ?userQuery (knowsNextTokencode instructed))
)

(defrule chance-pin-stolen
  (userQuery (knowsPasscodeEntry yes))
  (cfact synced ?cf&:(> ?cf 0.2))
  ?exToken <- (exToken (pinStolen ?x))
  ?control <- (control (phase query) (loopExit ?x))
  =>
  (bind ?*question* (fetch QUESTION))
  (call ?*question* setKey "chance-pin-stolen")
  (call ?*question* addResponseKey "yes")
  (call ?*question* addResponseKey "no")
  (bind ?response (eval (call ?*question* ask)))
  (modify ?exToken (pinStolen ?response))
  (modify ?control (phase isolate) (loopExit no))
)

(defrule disable-next-tokencode
  ?exToken <- (exToken (passcodeGuessing yes))
```

FIG. 21J

```
  ?token <- (token (nextTokencode TRUE) (enabled FALSE))
  ?control <- (control (phase isolate) (loopExit ?x))
  =>
  (bind ?*question* (fetch QUESTION))
  (call ?*question* setKey "disable-next-tokencode")
  (call ?*question* addResponseKey "ok")
  (call ?*question* ask)
  (modify ?token (enabled TRUE) (nextTokencode FALSE) (badPins
FALSE)
(badTokencodes FALSE))
  )

;(defrule pin-stolen
;   (exToken (pinStolen yes))
;   ?control <- (control (phase isolate) (loopExit ?x))
;   =>
;   (printout t "Since the PIN might be stolen, we need to
change it..."
crlf)
;   )

;****cleared pin**************************-
(defrule ask-user-clear-pin
  ?userQuery <- (userQuery (dontKnow unknown) (knowsClearPin
unknown))
  (client (multipleTransaction TRUE))
  (token (clearPin TRUE))
  ?control <- (control (phase query) (loopExit ?x))
  =>
  (bind ?*question* (fetch QUESTION))
  (call ?*question* setKey "ask-user-clear-pin")
  (call ?*question* addResponseKey "yes")
  (call ?*question* addResponseKey "no")
  (modify ?control (phase isolate) (loopExit no))
  (bind ?response (eval (call ?*question* ask)))
  (modify ?userQuery (knowsClearPin ?response))
  )

(defrule instruct-clear-pin
  ?userQuery <- (userQuery (knowsClearPin no))
  (token (clearPin TRUE))
  (client (multipleTransaction TRUE))
  ?control <- (control (phase isolate) (loopExit ?x))
  =>
  (bind ?*question* (fetch QUESTION))
  (call ?*question* setKey "instruct-clear-pin")
  (call ?*question* addResponseKey "ok")
  (call ?*question* ask)
  (modify ?userQuery (knowsClearPin instructed))
  )

;****lost token***************************-
(defrule ask-user-hasToken
```

FIG. 21K

```
   ?userQuery <- (userQuery (dontKnow unknown) (hasToken
unknown) (symptom
?sym)
                   (knowsNewPin ?knp) (knowsClearPin ?kcp)
(knowsPasscodeEntry
?kpe)
                   (knowsPin ?kp) (knowsNextTokencode ?knt))
   (test (and (neq ?sym lost-token) (neq ?sym found-token)))
   (test (and (eq ?knp unknown) (eq ?kcp unknown) (eq ?kp
unknown) (eq ?knt
unknown)))
   ?control <- (control (phase query) (loopExit ?x))
   =>
   (bind ?*question* (fetch QUESTION))
   (call ?*question* setKey "ask-user-has-token")
   (call ?*question* addResponseKey "yes")
   (call ?*question* addResponseKey "no")
   (bind ?response (eval (call ?*question* ask)))
   (modify ?userQuery (hasToken ?response))
   (modify ?control (phase isolate) (loopExit no))
   )

(defrule user-lost-token
   (token (emergencyAccess FALSE))
   (userQuery (symptom ?sym) (hasToken ?ht))
   (test (or (eq ?sym lost-token) (eq ?ht no)))
   ?control <- (control (phase isolate) (loopExit ?x))
   =>
   (bind ?*question* (fetch QUESTION))
   (call ?*question* setKey "user-lost-token")
   (call ?*question* addResponseKey "ok")
   (call ?*question* solution)
   (modify ?control (phase finish) (loopExit yes))
   )

(defrule token-still-lost
   (token (emergencyAccess TRUE))
   (userQuery (symptom ?sym) (hasToken ?ht))
   (test (or (eq ?sym lost-token) (eq ?ht no)))
   ?control <- (control (phase isolate) (loopExit ?x))
   =>
   (bind ?*question* (fetch QUESTION))
   (call ?*question* setKey "token-still-lost")
   (call ?*question* addResponseKey "ok")
   (call ?*question* solution)
   (modify ?control (phase finish) (loopExit yes))
   )

(defrule user-hasToken-emerg-on
   (token (emergencyAccess TRUE))
   (userQuery (symptom ?sym) (hasToken ?ht))
   (test (or (eq ?sym found-token) (eq ?ht yes)))
   ?control <- (control (phase isolate) (loopExit ?x))
   =>
   (bind ?*question* (fetch QUESTION))
```

FIG. 21L

```
    (call ?*question* setKey "user-has-token-emerg-on")
    (call ?*question* addResponseKey "ok")
    (call ?*question* solution)
    (modify ?control (phase finish) (loopExit yes))
  )

;****more attempts remain**************************
(defrule just-have-user-try-again
    (token (enabled TRUE) (clearPin ?cp) (newPin ?np)
(nextTokencode ?nt))
    (exToken (pinGuessing ?pg) )
    (userQuery (knowsClearPin ?kcp) (knowsNewPin ?knp) (knowsPin
?kp)
                (knowsPasscodeEntry ?kpe) (knowsNextTokencode
?knt))
    (test (or
              (and (or (eq ?kcp yes) (eq ?kcp instructed)) (eq
?cp TRUE))
              (and (or (eq ?knp yes) (eq ?knp insturcted)) (eq
?np TRUE))
              (and (eq ?kp yes) (eq ?pg yes))
              (and (or (eq ?kpe yes) (eq ?kpe instructed)) (eq
?nt FALSE))
              (and (or (eq ?knt yes) (eq ?knt instructed)) (eq
?nt TRUE))))
    ?control <- (control (phase isolate) (loopExit ?x))
    =>
    (bind ?*question* (fetch QUESTION))
    (call ?*question* setKey "just-have-user-try-again")
    (call ?*question* addResponseKey "ok")
    (call ?*question* solution)
    (modify ?control (phase finish) (loopExit yes))
  )

;****sync******************************************
(defrule no-recent-login
    (token (recentLogin FALSE))
    (userQuery (knowsPasscodeEntry yes))
    ?f1 <- (cfact synced ?cf&:(neq ?cf -0.5))
    ?control <- (control (phase isolate) (loopExit ?x))
    =>
    (retract ?f1)
    (assert (cfact synced ?cf -0.5))
    (modify ?control (phase query) (loopExit no))
  )

(defrule recent-login
    (token (recentLogin TRUE))
    ?f1 <- (cfact synced ?cf&:(neq ?cf 0.5))
    ?control <- (control (phase isolate) (loopExit ?x))
    =>
    (retract ?f1)
    (assert (cfact synced ?cf 0.5))
    (modify ?control (phase query) (loopExit no))
  )
```

FIG. 21M

```
(defrule out-of-sync
  (exToken (passcodeGuessing yes))
  (userQuery (knowsPasscodeEntry yes))
  ?f1 <- (cfact synced ?cf&:(< ?cf -0.2))
  ?control <- (control (phase isolate) (loopExit ?x))
  =>
  (bind ?*question* (fetch QUESTION))
  (call ?*question* setKey "out-of-sync")
  (call ?*question* addResponseKey "ok")
  (call ?*question* solution)
  (retract ?f1)
  (assert (cfact synced ?cf 1.0))
  (modify ?control (phase finish) (loopExit yes))
)

(defrule next-tokencode-single
  ?f1 <- (cfact synced ?cf)
  (userQuery (knowsPasscodeEntry yes))
  (token (nextTokencode TRUE))
  (exToken (pinStolen no))
  (client (multipleTransaction FALSE))
  ?control <- (control (phase isolate) (loopExit ?x))
  =>
  (bind ?*question* (fetch QUESTION))
  (call ?*question* setKey "next-tokencode-single")
  (call ?*question* addResponseKey "ok")
  (call ?*question* solution)
  (retract ?f1)
  (assert (cfact synced ?cf 1.0))
  (modify ?control (phase finish) (loopExit yes))
)

(defrule user-knows-everything
  ?f1 <- (cfact synced ?cf&:(< ?cf 1.0))
  (token (enabled TRUE) (clearPin ?cp) (nextTokencode ?nt))
  (exToken (pinStolen ~yes) (pinGuessing ?pg) (passcodeGuessing ?pcg))
  (session (solution unkown))
  (userQuery (knowsClearPin ?kcp) (knowsPin ?kp)
             (knowsPasscodeEntry ?kpe) (knowsNextTokencode ?knt))
  (test (or
             (and (eq ?nt TRUE) (eq ?knt yes))
             (and (eq ?cp TRUE) (eq ?kcp yes))
             (and (eq ?pcg yes) (eq ?kpe yes))
             (and (eq ?pg yes) (eq ?kp yes))))
  ?control <- (control (phase isolate) (loopExit ?x))
  =>
  (bind ?*question* (fetch QUESTION))
  (call ?*question* setKey "user-knows-everything")
  (call ?*question* addResponseKey "ok")
  (call ?*question* solution)
  (retract ?f1)
  (assert (cfact synced ?cf 1.0))
```

FIG. 21N

```
    (modify ?control (phase finish) (loopExit yes))
  )

;****no problem detected******************************-
(defrule maybe-login-name-incorrect
  ;(cfact synced ?cf&:(eq ?cf 1.0))
  ?userQuery <- (userQuery (knowsLoginName unknown))
  (user (loginName ?user-name))
  (exToken (noProblemDetected yes))
  ?control <- (control (phase query) (loopExit ?x))
  =>
  (bind ?*question* (fetch QUESTION))
  (call ?*question* setKey "maybe-login-name-incorrect")
  (call ?*question* setSupplementalText ?user-name)
  (call ?*question* addResponseKey "yes")
  (call ?*question* addResponseKey "no")
  (bind ?response (eval (call ?*question* ask)))
  (modify ?userQuery (knowsLoginName ?response))
  (modify ?control (phase isolate) (loopExit no))
  )

(defrule no-problem-detected
  ?exToken <- (exToken (noProblemDetected unknown))
  (token (expired FALSE) (newPin FALSE) (clearPin FALSE)
(nextTokencode
FALSE)
          (badTokencodes FALSE) (badPins FALSE) (assigned TRUE)
(emergencyAccess FALSE)
          (enabled TRUE))
  (user (expired FALSE))
  (userQuery (knowsPasscodeEntry ~instructed)
(knowsNextTokencode
~instructed)
              (knowsClearPin ~instructed) (knowsNewPin
~instructed))
  ?control <- (control (phase isolate) (loopExit ?x))
  =>
  (modify ?exToken (noProblemDetected yes))
  )

(defrule login-name-correct-and-no-problems
  ?userQuery <- (userQuery (knowsLoginName yes))
  (exToken (noProblemDetected yes))
  ?control <- (control (phase isolate) (loopExit ?x))
  =>
  (bind ?*question* (fetch QUESTION))
  (call ?*question* setKey "login-name-correct-and-no-
problems")
  (call ?*question* addResponseKey "ok")
  (call ?*question* solution)
  (modify ?control (phase finish) (loopExit yes))
  )

(defrule login-name-incorrect-and-no-problems
  (user (loginName ?user-name))
```

FIG. 21O

```
   ?userQuery <- (userQuery (knowsLoginName no))
   (exToken (noProblemDetected yes))
   ?control <- (control (phase isolate) (loopExit ?x))
   =>
   (bind ?*question* (fetch QUESTION))
   (call ?*question* setKey "login-name-incorrect-and-no-
problems")
   (call ?*question* setSupplementalText ?user-name)
   (call ?*question* addResponseKey "ok")
   (call ?*question* solution)
   (modify ?control (phase finish) (loopExit yes))
   )

;****if nothing else fires***********************
(defrule phase-loop-gone-wild
   ?control <- (control (count ?i))
   (test (>= ?i 10))
   =>
   (bind ?*question* (fetch QUESTION))
   (call ?*question* setKey "phase-loop-gone-wild")
   (call ?*question* addResponseKey "ok")
   (call ?*question* solution)
   (halt)
   )

(defrule no-other-rules-will-fire
   (declare  (salience -100))
   ?control <- (control (phase ~finish))
   =>
   (bind ?*question* (fetch QUESTION))
   (call ?*question* setKey "no-other-rules-will-fire")
   (call ?*question* addResponseKey "ok")
   (call ?*question* solution)
   (halt)
   )

;***************************************************-
; normal exit
(defrule finish
   (control (phase finish) (loopExit yes))
   =>
   (halt)
   )

;***************************************************-
;***************************************************-
;***************************************************-

;(reset)
;(load-facts "init.fct")
;(load-facts "system.fct")
;(load-facts "ovride.fct")
;(run)
```

FIG. 21P

SYSTEM THAT EMPLOYS INFERENCING FOR TROUBLESHOOTING COMPLEX USER AUTHENTICATION PROBLEMS

CROSS REFERENCES TO RELATED APPLICATIONS

This application claims priority from U.S. Provisional Application No. 60/134,921, Daniel V. LaRue, "Artificial intelligence" based system for troubleshooting token authentication apparatus, filed May 19, 1999.

BACKGROUND OF THE INVENTION

1. Field of the Invention

This invention relates to authentication systems and artificial intelligence, specifically to an inference system for troubleshooting and maintenance of authentication apparatus.

2. Description of Related Art

To prevent unauthorized access to systems and facilities, many corporations and agencies provide their staff with personal authentication devices such as the credit card sized calculator device in U.S. Pat. No. 4,720,860 to Weiss, Jan. 19, 1998. These devices (tokens) augment or replace traditional password authentication systems (password systems). Token-based authentication provides superior security, when compared to password authentication. Once in use, authentication tokens allow the staff members to obtain secure access to corporate resources. Often these resources are critical to performing tasks.

When put into practice, these devices and the system components that are necessary for operation (token authentication system) can be comparatively complex. Specifically, the commercial system using Weiss's apparatus has a complexity of usage and of operating state in excess of password systems. The complex states of token authentication systems increase the likelihood of authentication trouble. Whereas password systems have a trivial problem state, token authentication systems have many problem states due to the complexity. The erroneous rejection of an authorized user during authentication is the primary symptom. Historically, the rate of problem occurrence in token authentication systems exceeds that of password systems. Problem states for token authentication systems include user not knowledgeable of token usage, user forgot PIN (personal identification number), token expired, token disabled, and time reference drift. The problem occurrence rate scales up when thousands of users are given authentication devices. The problem states for password systems is trivial, the user forgot the password. Authentication problems with tokens are typically of high urgency, since the staff member with the problem cannot obtain access to the systems needed to perform a task. To enable the staff member to perform their task in a timely manner, the problem should be remedied as quickly as possible. Unfortunately due to the increased complexity, token authentication problems require more time and skill to solve, when compared to password systems. The delay may result in loss of productivity for the staff members unable to attain system access.

Also due to the increased complexity, token authentication systems require system knowledge and skilled troubleshooting when problems arise. These skills are unique to the particular token authentication system and exceed the skills required for password systems. Authentication problems are typically solved by service personnel, which are trained to solve many types of problems. Service personnel need additional training and on-the-job experience to build the skills necessary for solving problems specific to token authentication systems. The training consumes more resources than those required for password systems. There is a time lag between the time the service personnel start training and the time when troubleshooting proficiency is attained. During that time before proficiency is reached, staff members with authentication problems who call these service personnel, will receive degraded service with possible loss in productivity. Of course, degraded service is counter to the goals of all service organizations.

Troubleshooting complex authentication systems in an urgent service environment demands a high degree of attention and focus from the service personnel. Issues that must be managed simultaneous to the troubleshooting activity will, in all likelihood, receive reduced attention. This can result in reduced attention on one key issue, the awareness of security and security policies. Unfortunately, reduced attention on security enhances the opportunity for successful security attacks, targeted on the service personnel themselves. This class of security attack is known as "social engineering". It is understood that, social engineering attacks primarily take advantage of situations that reduce security awareness. Troubleshooting complex systems is a situation that draws attention away from security, thereby weakening security.

When thousands of staff members use token authentication, many skilled service personnel need to be on duty at all hours to solve potential authentication problems. To properly service thousands of staff members using token authentication, the number of service personnel must be increased or the existing personnel must be increasingly burdened. The overall effect is an increase in resource requirements to properly service thousands of users who have authentication tokens. These resource increases are in excess of those needed for password authentication.

Thus when put into practice, authentication tokens introduce a new and complex system to the array of systems already present. Due to the critical need that users be able to access the systems being protected by tokens there is a requirement to consistently, quickly and securely troubleshoot and maintain the complex system.

OBJECTS AND ADVANTAGES

Accordingly, several objects and advantages of this invention are:

(a) to provide an inference system that quickly and accurately solves authentication problems in the complex systems used for token authentication—this addresses the increased problem occurrence rate introduced by the added system complexity and addresses the need to urgently solve user authentication problems manifest in complex authentication systems;

(b) to provide an inference system that delivers consistent, expert-level performance for token authentication system troubleshooting in spite of the variable skills of service personnel—this eliminates degraded troubleshooting performance, due to service personnel who are not skilled in token authentication troubleshooting;

(c) to provide an inference system that reduces the service skills and system knowledge required for token authentication system troubleshooting—this reduces the resources needed to train a large number of service personnel to be proficient at authentication troubleshooting;

(d) to provide an inference system that reduces the demand for service personnel attention and explicitly reminds service personnel of security policy during operations that are encountered as a result of authentication problems—this raises the security awareness of personnel, which is the primary defense against social engineering attacks;

(e) to provide an inference system that can be used by staff members with authentication tokens to solve their own authentication problems without using service personnel—this further reduces the service resources needed to troubleshoot authentication problems;

(f) to provide an inference system that can be used to automatically perform administrative tasks required to maintain authentication systems;

Further objects and advantages are to provide an inference system which can be integrated with an authentication system, which has self-contained artificial knowledge or patterns related to troubleshooting and maintaining authentication systems, which contains sufficient knowledge or patterns to solve the classes of authentication problems that consume service resources, which enables companies and agencies to avoid large increases in service resources when deploying authentication tokens to thousands of users, which contains knowledge or patterns that can be enhanced to solve new problems as they are discovered. Still further objects and advantages will become apparent from a consideration of the ensuing description and drawing.

SUMMARY OF THE INVENTION

The objects of the invention are achieved through troubleshooting apparatus for use with a user authentication subsystem of a type that employs a complex user authentication technique such as authentication by token. The apparatus receives inputs from and produces outputs to an interactive interface that a troubleshooter uses to do the troubleshooting. The apparatus includes an authentication information database in the user authentication subsystem and an authentication problem solving system. The authentication information database system responds to a query by providing a result that typically includes state information about the authentication system. The authentication problem solving system includes an inferencer which is able to draw inferences based on information that is known to the inferencer, that is received from the interactive interface, or that is received from the authentication information database. The problem solving system responds to an input from the interactive interface by providing a query to the authentication information database and responds to a result of the query by providing an output to the interactive interface. The provision of the query and/or the output involves the use of the inferencer.

The output to the interactive interface may be or include a security warning for the problem solver, and the query may specify a modification of the authentication information database. The authentication problem solving system may provide an indication of the proposed modification to the interactive interface and provide the query in response to an input from the interactive interface, giving the troubleshooter the option of permitting the modification or not.

One way of implementing the inferencer is by means of a knowledge base including rules and facts. The rules are fired in response to the facts, the fact being contained in the knowledge base, having been received from an input, and/or having been received in a result of a query. The output to the interactive interface is the result of the firing of one or more rules.

The troubleshooting apparatus is particularly useful when the complex user authentication technique involves a token that the user uses to authenticate himself to the user authentication subsystem. The troubleshooting apparatus receives an identifier associated with the token from the interactive interface and uses the identifier to obtain authentication state associated with the token from the authentication database.

BRIEF DESCRIPTION OF THE DRAWING

FIG. 18 is the authentication states list.

FIG. 19 is the possible solution list.

FIG. 20 shows an actual rule employed in a preferred embodiment.

FIG. 21A–FIG. 21P is a complete listing of the rules in a preferred embodiment.

DETAILED DESCRIPTION

Figure 1:
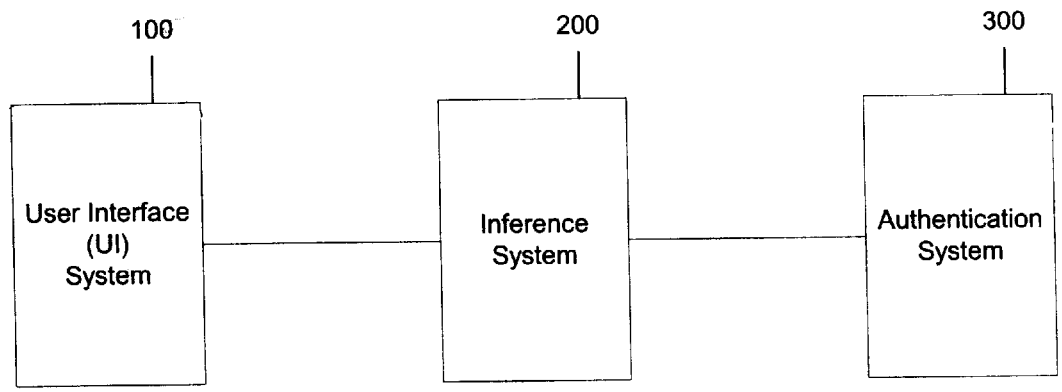
FIG. 1 is a block diagram illustrating the inference system logically between the user interface system and the authentication system, in accordance with the present invention.

Usually, when a token user has a problem authenticating they call the corporate help desk. The troubleshooter at the help desk then needs to listen to the user's problem statement (typically, simply "I can't log in") and then solves the authentication problem. Without this invention the troubleshooter needs to access the state of the authentication system 300, from that state reason what the problem might be, ask the user some questions to confirm the problem, and fix the problem.

Reasoning about the authentication problem and knowing what questions to ask the user require knowledge and skill. This is especially true with some authentication systems since solutions and fixes cannot be directly mapped from authentication state. In one such authentication system the solution to a 'token disable' state can be one of many. The token disable state could be caused by, user guessing at the PIN (personal identification number), a hacker, token out of time synchronization or administrative action to intentionally disable the token. The troubleshooter has many possible problem fixes from which to choose. Only one of the fixes is correct. The obvious fix to 'enable' the token (affect the token disabled state), is a security violation if administrative action to disable the token has taken place. Synchronizing the token might be a fix, however there is no direct authentication state to determine if that is needed. Synchronizing the token must be inferred from other states, including the length of time it has been since the last successful authentication by the user. Should the troubleshooter enable the token, resynchronize the token, reset the PIN, clear the bad PIN counter, or thwart the hacker? The correct solution is best inferred from a combination or the authentication state and user statements, since in most cases there is no direct mapping of authentication state to the correct solution. Inferring the correct solution can be done by an expert at troubleshooting tokens or by someone less skilled using the inference system in this invention. The authentication state being considered here is only one of many. FIG. 18 shows a more complete list of the singular authentication states. In the states in the authentication system are combinational. As such, the singular states of FIG. 18 combine in various ways to form a larger state space. FIG. 19 shows a more complete list of possible solutions. The solutions are combinational and form a larger solution space.

This invention provides features that make authentication troubleshooting manageable for those not skilled in authentication systems. With this invention, finding solutions to authentication problems can be accomplished with less dependence on skill. The features of this invention include a question and answer user interface, automatic access of authentication state using database queries, inference of authentication problems to automatically find solutions, inference of security details to automatically remind the user of security issues, remedy of the problem to automatically apply a fix to the authentication state (or other solution to the problem). This invention can be applied to many types of authentication systems, such as time synchronized tokens, cryptographic tokens, smart cards and public key systems.

The discussion below includes a series of user interface (UI) screen shots, to show how this invention is used to troubleshoot the 'disabled token' state problem above. The discussion assumes the troubleshooter has already logged in to the inference system using a Web browser. The troubleshooter login process is described in a later section.

The troubleshooting process starts when the user with an authentication problem calls the help desk and troubleshooter answers the phone. In this invention, the user is then asked to identify the authentication token with the problem. In the Web browser, in the user entry screen FIG. 11, the token serial number is typed into the entry box 1102 and the submit button 1104 is pressed. This invention then starts the inference process. The process continues internal to the inference system until the inference system makes an external request that a question be answered. The question request results in the presenting the user with the screen in FIG. 12. This screen shows the question and answer interface that is provided by this invention. The question text 1202 presented along with zero or more choices of answers 1204, 1206, 1208, 1210 along with a submit button 1212. As with the 'disabled token' troubleshooting example above the user initially states that he could not login. The appropriate answer 1204 is selected by the troubleshooter and the submit button 1212 is pressed. The inference process continues internally using the selected answer.

Figure 13:
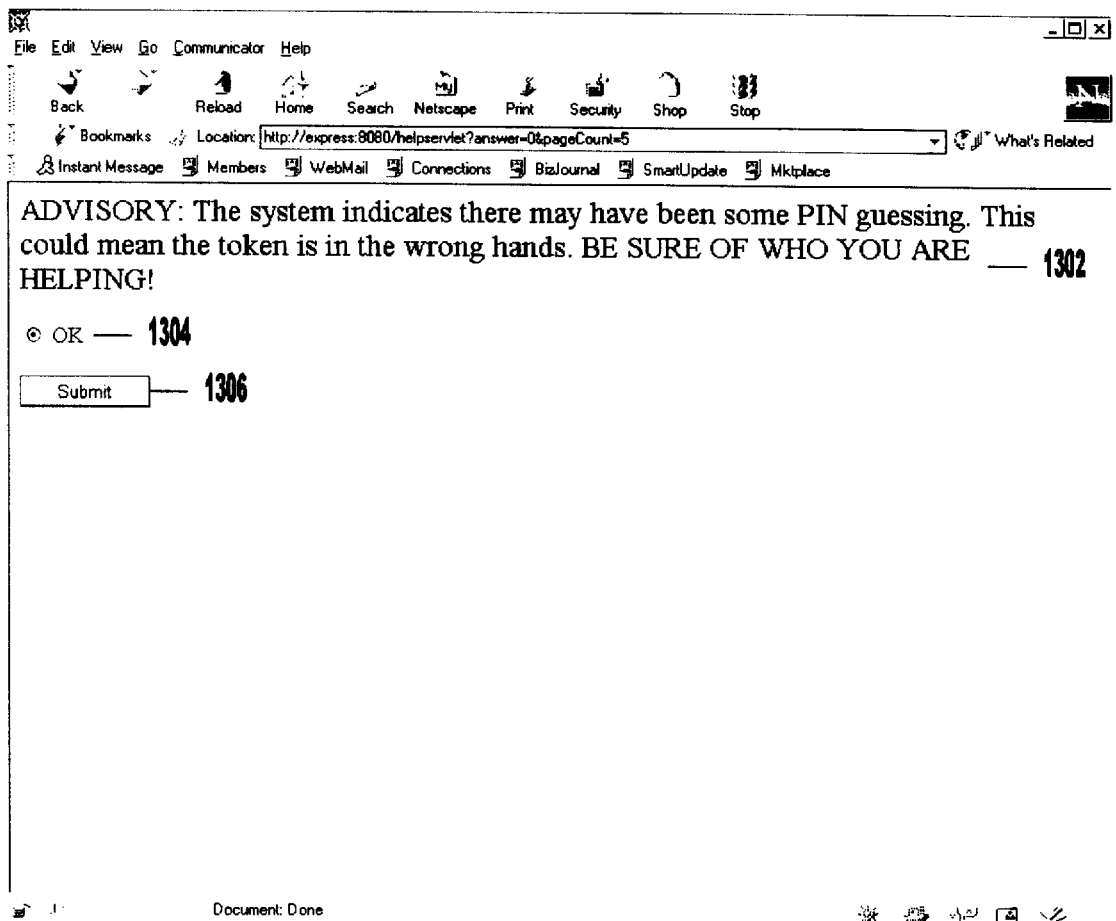
FIG. 13 is a security advisory screen.
Figure 14:
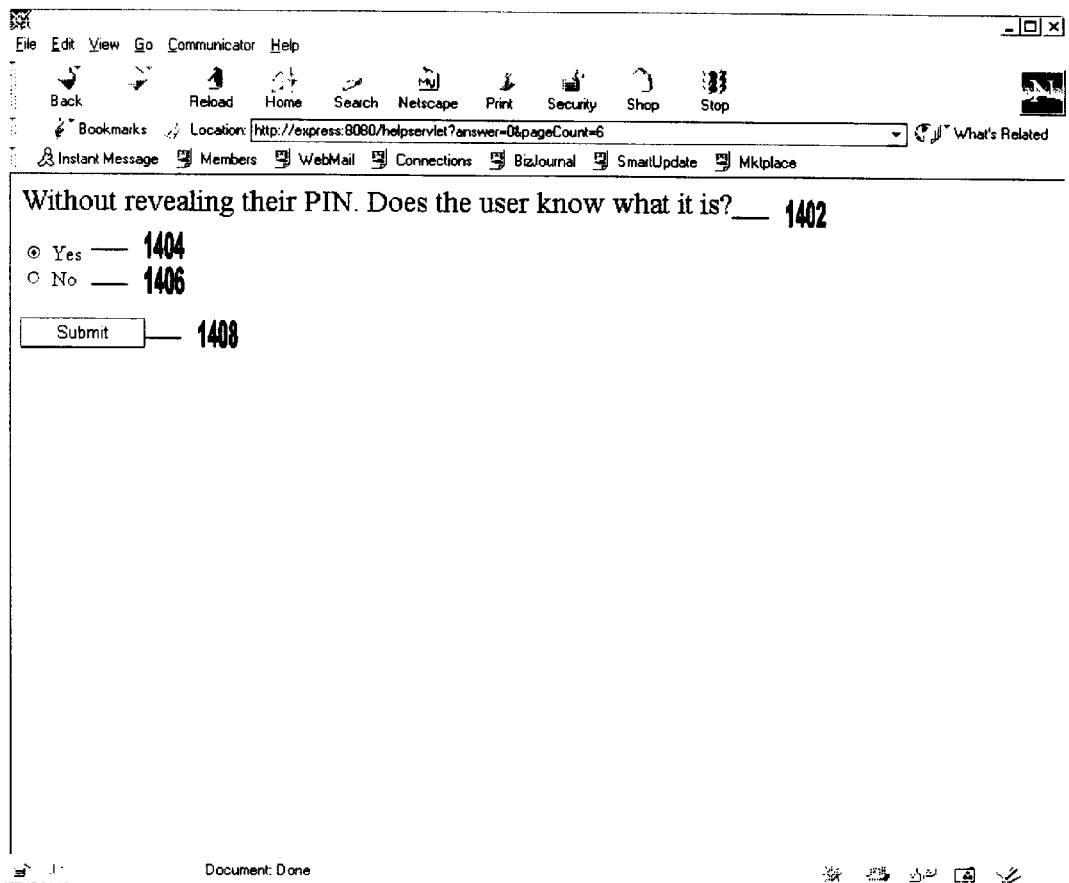
FIG. 14 is a general question screen.

The next question is shown in FIG. 13. This question has only one answer 1304. As such, its purpose is not to get an answer but to advise the troubleshooter of a security concern using the question text 1302. The processing has inferred from authentication state that some PIN guessing has occurred, which is a indication of hacker break-in attempt. After being informed, the troubleshooter for instance, might use the procedures established by corporate security to validate the user. Once the troubleshooter is certain that the user has been properly validated, the troubleshooter clicks on submit button 1306. The inference process continues until it determines that the user should be asked if he or she knows his or her PIN. Thereupon the troubleshooting system presents the screen in FIG. 14 to the troubleshooter. The troubleshooter asks the user whether he or she knows his or her PIN (1402), and if the user answers yes, the troubleshooter selects yes 1404 and if not, the troubleshooter selects no 1406 and then presses submit button 1408.

Figure 15:
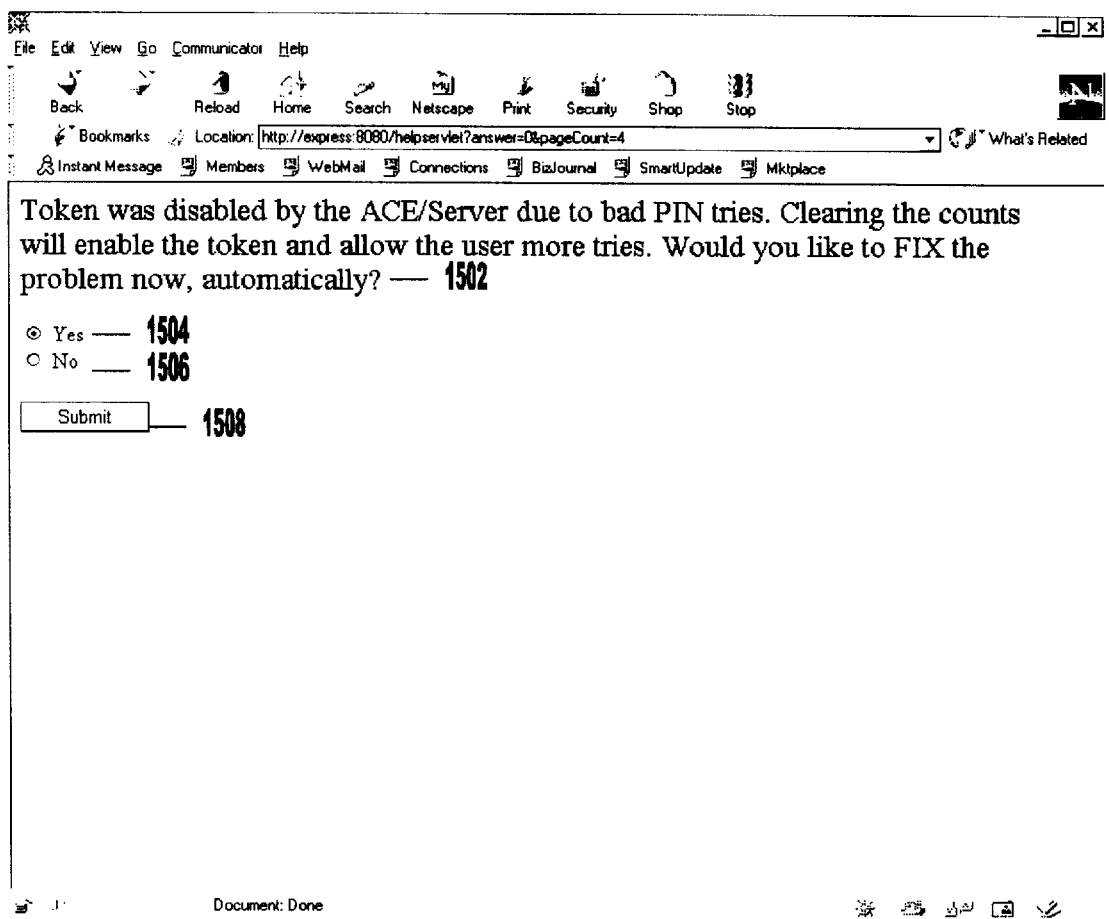
FIG. 15 is question screen that indicates a fix.
Figure 16:
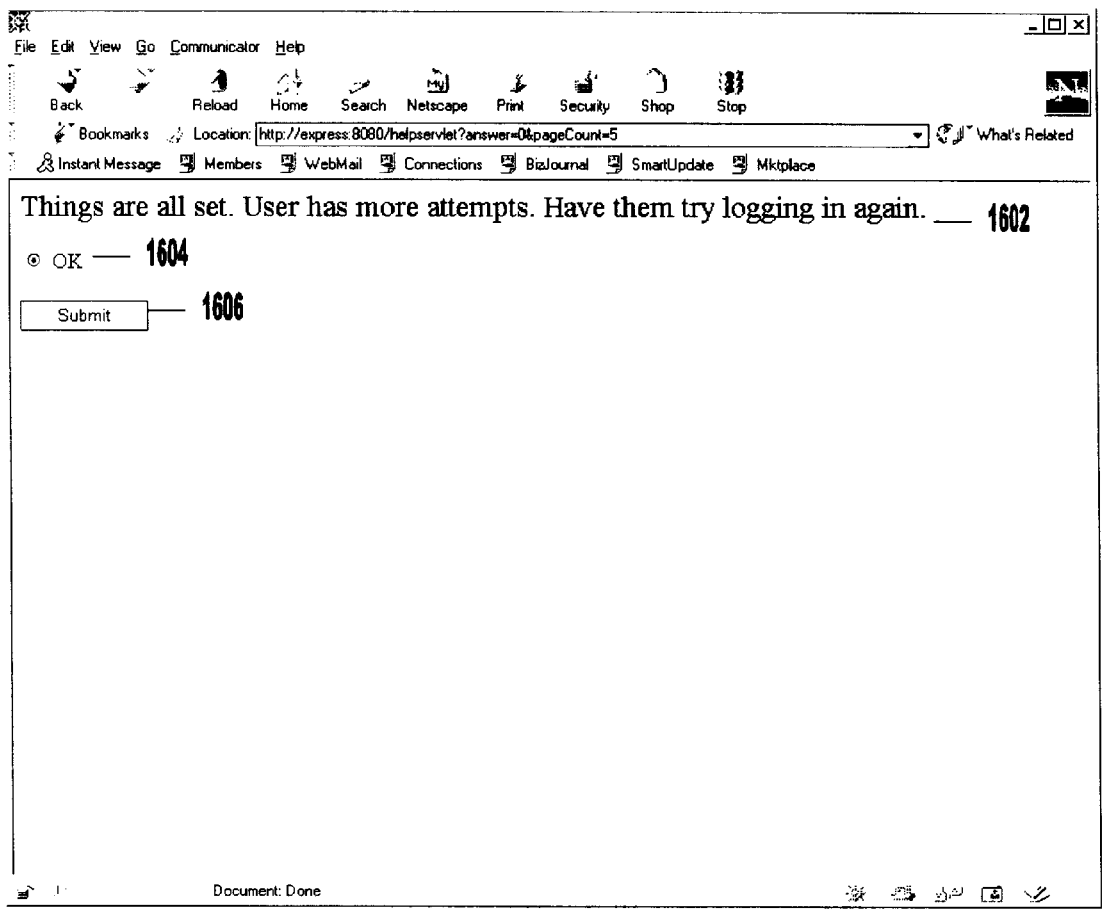
FIG. 16 is question screen that indicates a solution.
Figure 17:
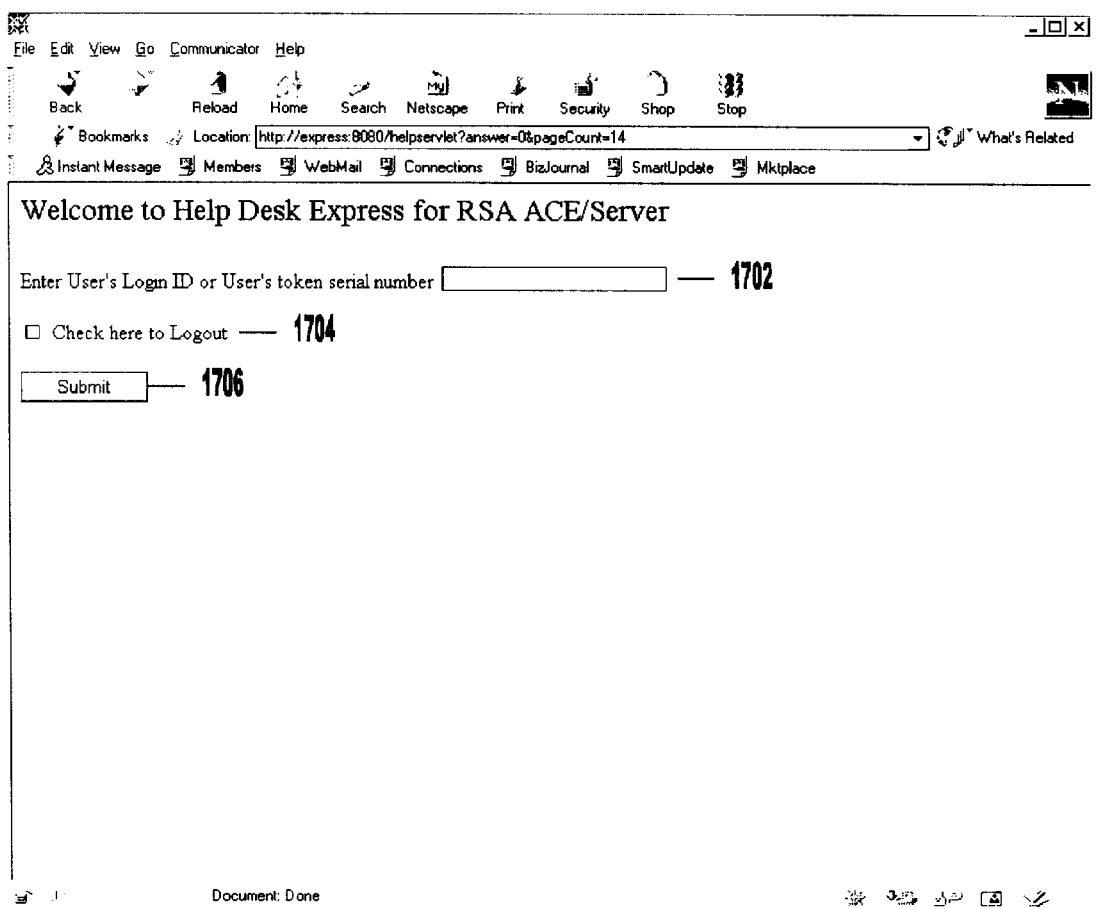
FIG. 17 is an empty user entry screen, seen when waiting for a user to call with a problem.

The inferencing process continues with this new answer and produces the next question, shown in FIG. 15. This question is a special case. It contains a fix for the problem. Given the previous answers, the authentication state and the internal inferences the fix appears in the question text 1502. The system has determined that 'clearing the count(er)s will enable the disabled token. The troubleshooter has the choice to answer yes 1504 and fix the problem or overrule the system and say no 1506. The yes selection is made and the submit button 1508 is pressed. The system first automatically performs a fix operation on the authentication state. Then the inference process continues searching for another fix if necessary. However, it is determined that the fix was final and the question in FIG. 16 is presented. This question is another special case. It is the solution question that indicates that this troubleshooting session is complete. There is only one answer 1604, so this question is only providing information to the troubleshooter. The question text 1602 indicates that the problem is solved and user should try to log in. With the problem solved the troubleshooter finished the session by pressing submit button 1606. The inference system closes the session and presents an empty user entry screen FIG. 17. The system and the troubleshooter are ready to take another call from a user with an authentication problem. The screen of FIG. 17 is identical to the screen of FIG. 11, with field 1702 corresponding to field 1102, checkbox 1704 permitting the troubleshooter to log out, and submit button 1706 corresponding to submit button 1104.

Figure 3:
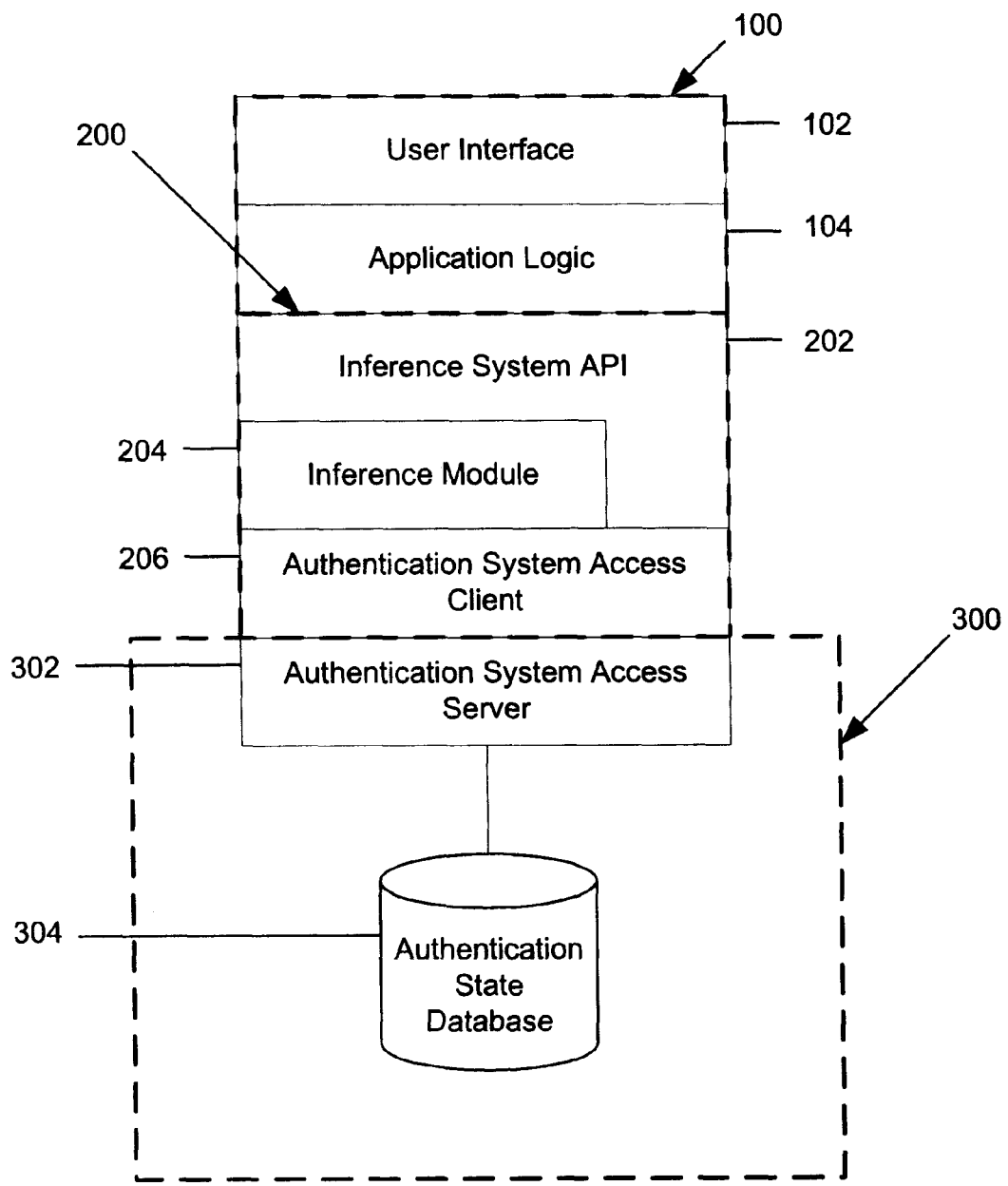
FIG. 3 is a diagram of the software layers in the general embodiment consisting of a inference module used in conjunction with an inference system application programming interface (API), and authentication system access client, in accordance with the present invention. Other system components such as application logic and user interface are also shown. Authentication system access server and authentication state database are also shown.

Description of the General Embodiments—FIGS. 1, 3

The system level block diagram of the present invention is illustrated in FIG. 1. The inference system 200 is logically connected to a user interface (UI) system 100 and an authentication system 300. The UI system is connected by a software interface to the inference system and the inference system is connected by an interface to the authentication system. In a general embodiment the UI system, the inference system and the authentication system, are each composed of certain software components, as shown in FIG. 3. The systems and software components may all execute on the same computer platform. A computer platform is composed of computer hardware and an operating system. Alternatively the systems and software components of this invention may execute on multiple computer platforms, such as in a client/server network or internet computer environment.

The software components and software interfaces of a general embodiment are depicted in FIG. 3. Though this invention is primarily concerned with the inference system 200, some components of the other systems that are critical to understanding the operation of this invention are shown. In this figure a user interface 102 and application logic 104 are joined by an interface (the line between 102 and 104) and compose the UI system 100. The inference system API (inference system application programming interface) 202, an inference module 204 and the authentication system access client 206 are each joined by interfaces to compose the inference system 200. An authentication system access server 302 and an authentication state database 304 are joined by an interface to compose the authentication system 300. The three systems 100, 200 and 300 are joined by two system interfaces. One system interface is located where the application logic 104 interfaces with the inference system API 202. The other system interface is located where the authentication system access client 206 interfaces with the authentication system server 302.

Figure 6:
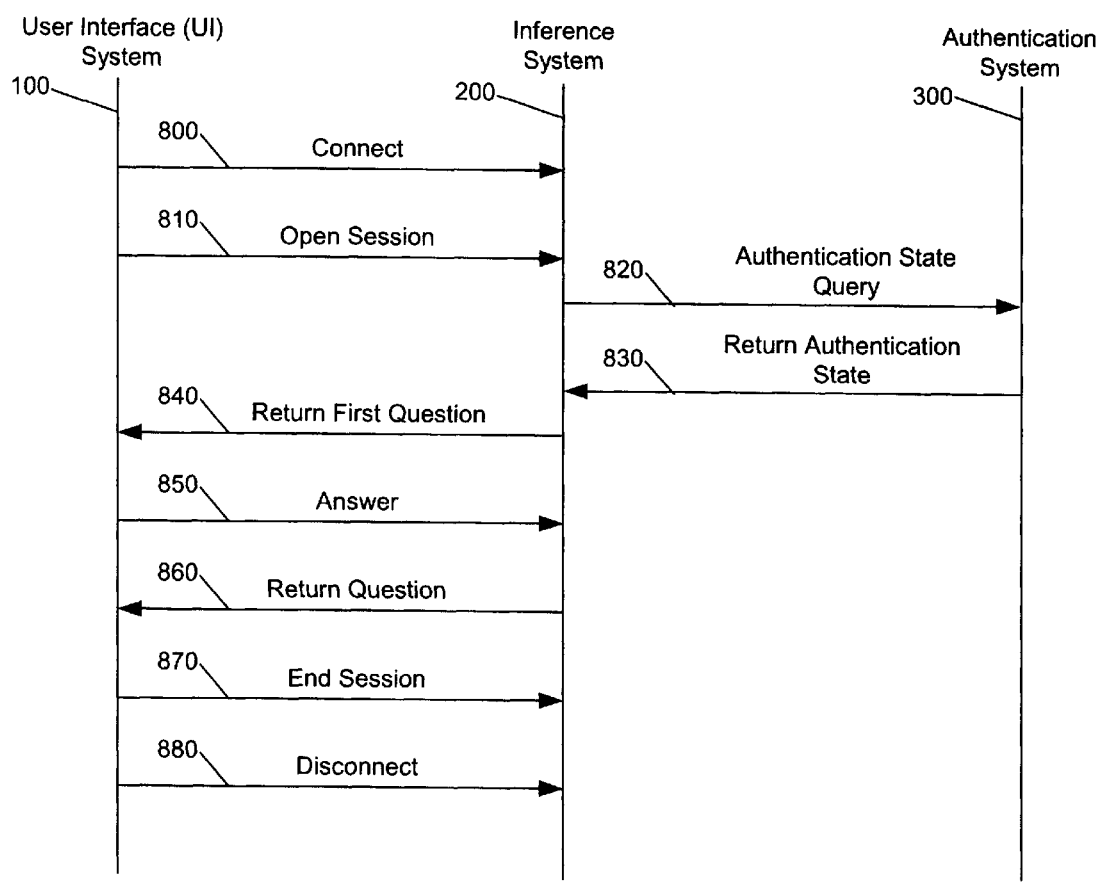
FIG. 6 is a diagram illustrating at a high level, the information and sequence that pass between the inference system, the UI system, and the authentication system in the general embodiment.

Operation of General Embodiment—FIGS. 1, 3, 6

The system level block diagram is shown in FIG. 1. Though the operation of the UI system 100 and the authentication system 300, when considered alone, is not essential to this invention, the operation of the UI system and the authentication system (other systems) in combination with the inference system 200 is essential to this invention. Accordingly typical, relevant operations of the UI system and the authentication system are described to enhance understanding of combining the inference system in the present invention with these other systems. Only the essential operations of these other systems are described.

The sequence diagram FIG. 6 shows a sequence of information that is exchanged between the systems concerning this invention during a troubleshooting or maintenance session. The sequence begins with 'connect' 800, proceeds through sequences 810, 820, 830, 840, 850, 860, 870 and 880. The 'connect' information and 'disconnect' information 880 are used to manage the service connection and occur once. The connection supports one to many troubleshooting sessions. The 'open session' 810 and 'end session' 870 occur once per troubleshooting session. The other information sequences 820, 830, 840, 850, 860 occur zero to many times and may occur out of order with respect to each other, in other words not in a strict sequence. The session ends when the 'end session' information sequence occurs. The description of the operation of this invention will approximately follow the sequence presented in FIG. 6.

Referring to FIG. 3 and FIG. 6 operation of this invention is initiated by a troubleshooter person who interacts with the user interface 102 and for example activates a graphical user interface (GUI) button to open a connection. The activation is detected by the application logic 104. The application logic will respond by sending 'connect' information 800 to the inference system API 202. To begin a troubleshooting session to solve a specific problem the troubleshooter interacts with the user interface. The activation is detected by the application logic, the application responds by sending 'open session' information 810 to the inference system API. Information relating to the session that is opened can be included in the 'open session' information. For example, if a session is opened to troubleshoot a user's authentication token, then the user identification can be included with the open session information.

The inference system API responds to the 'open session' information, by initiating a query state (internal to the inference system 200) to the authentication system access client 206. The authentication system access client responds by sending 'authentication state query' information 820 to the authentication system access server. The authentication system access server collects the state requested in the 'query state' information, and responds by sending 'authentication state' information 830 to the authentication system access client. The 'authentication state' information is translated if necessary by the authentication system access client (or later translated by the inference system API), to a form that is useable by the inference module. The authentication system access client sends the 'authentication state' information to the inference system API. The inference system API sends the 'authentication state' information to the inference module 204 and the inference module begins processing based on the 'authentication state' information.

In the general embodiment the inference module processes the 'authentication state' information using artificial intelligence (AI) techniques as pseudo knowledge to find a solution. There are many AI techniques such as expert systems and neural networks that may be used by the inference module to represent knowledge. Neural networks are a branch of AI that learn to connect patterns to solutions. Neural networks could be used to recognize authentication state patterns and find solutions based on the patterns.

In the general embodiment, the inference module contains representative knowledge about one or more of the following, troubleshooting an authentication system, maintaining an authentication system, and authentication system security policies. Inference module processing can gather more information by loading information stored in a previous session, getting additional state information from the authentication system via the authentication system access client, or by sending 'question' information 850/860 to the application logic via the inference system API. In response to 'question' information the application logic presents the troubleshooter with the question via the user interface.

After the troubleshooter answers the question via the user interface, the application logic sends 'answer' information 850 to the inference module via the inference system API. The inference module can send 'query state' information to the authentication system or 'question' information to the UI system zero or as many times as directed by inference module processing. Inference module processing will continue (including gathering more information) until it detects that a 'solution' is found. In some cases, an acceptable end to inference processing is detecting that a solution cannot be found, or in other words a null solution is found.

When a solution (or null solution) is found the inference module sends 'solution' question to the application logic via the inference system API. Also, when a solution is found the inference module may store information about this session for use in a later session. The application logic detects the 'solution' question and in conjunction with the user interface presents the troubleshooter with the solution. The troubleshooter confirms the solution via the user interface and the application logic sends 'end session' information 870 to the inference system API, which ends the troubleshooting session. When the troubleshooter has completed any number of sessions, the desire to disconnect is indicated via the user interface. The application logic sends 'disconnect' information 880 to the inference system and the connection is terminated.

Figure 2:
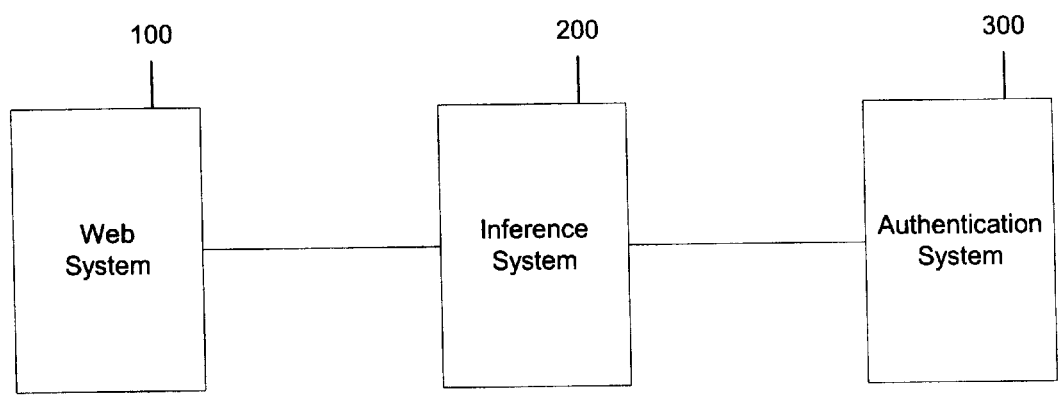
FIG. 2 is a block diagram illustrating the inference system logically between the Web system and the authentication system, in accordance with the present invention.

Description of the Preferred Embodiment—FIG. 2, 4

The system level block diagram of the preferred embodiment is illustrated in FIG. 2. The inference system 200 is logically connected to the Web system 100 and an authentication system 300. The Web system is connected by an interface to the inference system and the inference system is connected by an interface to the authentication system. In the preferred embodiment the Web system, the inference system and the authentication system, are each composed of certain software components shown in FIG. 4. The software components of this invention reside and are executed on multiple computer platforms. A computer platform is composed of computer hardware and an operating system.

Figure 4:
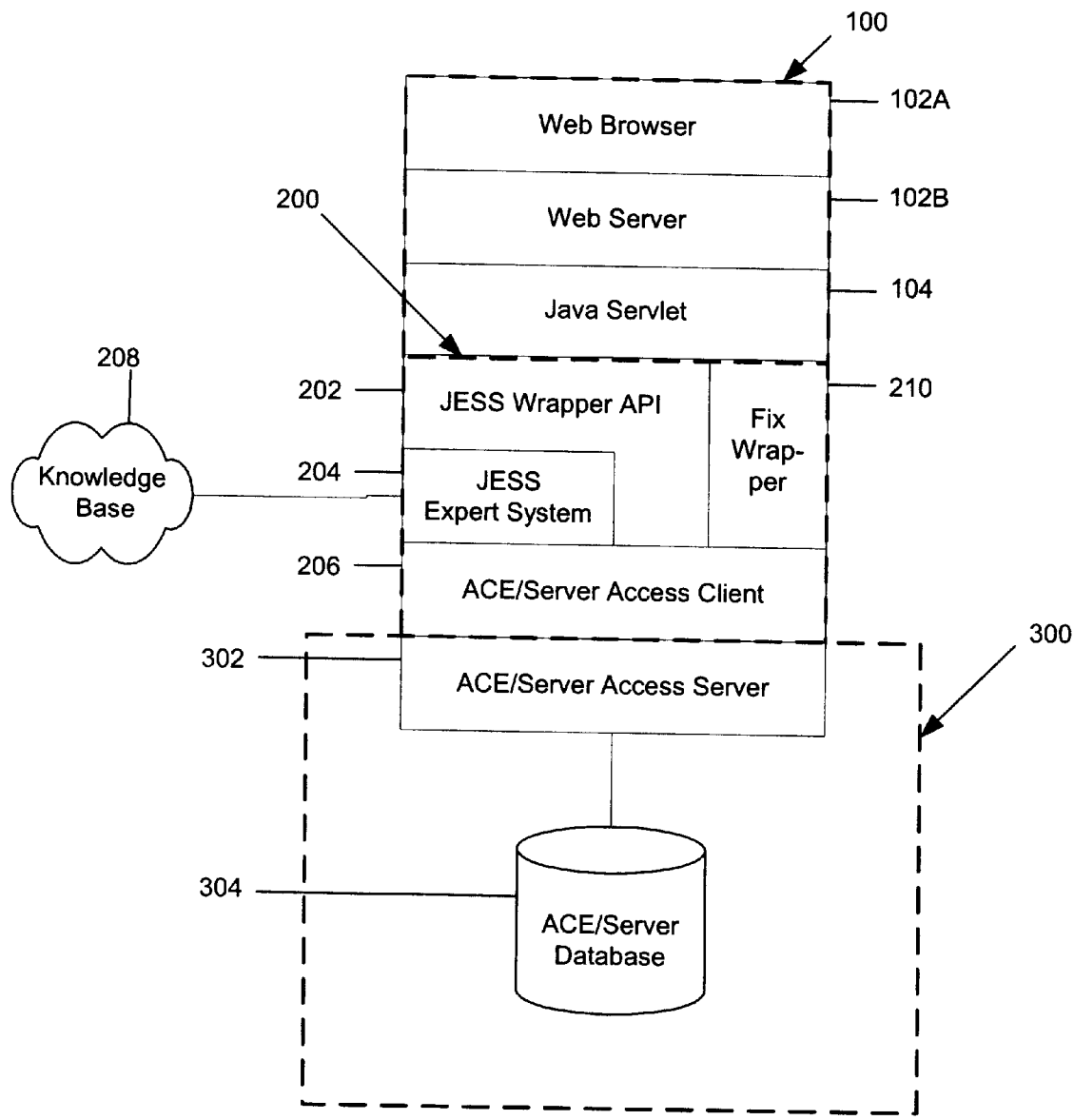
FIG. 4 is a diagram of the software layers in the preferred embodiment consisting of a JESS expert system shell and knowledge base used in conjunction with a JESS wrapper application programming interface (API), a fix wrapper, and ACE/Server access client, in accordance with the present invention. Other system components are the Java servlet, Web server, Web browser, ACE/Server access server, and ACE/Server database.

The software components and software interfaces of preferred embodiment are depicted in FIG. 4. Though this invention is primarily concerned with the inference system 200, components of the other systems that are critical to understanding the operation of this invention are shown. In this figure the Web Browser 102A, the Web Server 102B, and the Java servlet 104 are joined by interfaces (the lines between 102A, 102B and 104) and compose the Web System 100. The JESS wrapper API 202, the JESS expert system 204, the ACE/Server access client 206 the Knowledge Base 208, and the Fix Wrapper 210 are joined by interfaces to compose the inference system 200. The ACE/Server access server 302 and the ACE/Server database 304 are joined by an interface to compose the authentication system 300. The three systems 100, 200 and 300 are joined by two system interfaces. One system interface is located where the Java servlet 104 interfaces with the JESS wrapper API 202 and the Fix wrapper 210. The other system interface is located where the ACE/Server access client 206 interfaces with the ACE/Server access server 302.

Operation of Preferred Embodiment—FIG. 2, 4, 5, 7, 8, 9, 10, 11, 12, 13, 14, 15, 16, 17,20

The operation of the preferred embodiment is similar to the operation of the general embodiment. The differences are described herein. In the preferred embodiment the JESS expert system 204 (FIG. 4) processes the authentication state information using artificial intelligence techniques specific to expert systems. JESS stands for "Java Expert System Shell." Typical of expert systems, the JESS expert system uses reasoning or inference to find solutions. The expert system shell reasons using an inference facility, known as an inference engine. The JESS expert system also contains other facilities useful for expert system developers. The JESS expert system used in this embodiment is available for commercial use. The JESS expert system can be obtained from the Web site http://herzberg.ca.sandia.gov/jess/. The JESS expert system is a derivative of the CLIPS expert system. The JESS expert system uses a language that is derived from the language used in the CLIPS expert system. The CLIPS expert system is a development of NASA. In the JESS expert system, inference is controlled by a knowledge base 208, which contains representative knowledge about the problem domain in the form of rules and facts.

Though not comprehensive, a simplified discussion relating to expert systems is presented to further understanding of this invention. A detailed discussion of expert systems and an explanation of the rules language can be found in "Expert Systems Principles and Programming" by Joseph Giarrantano and Gary Riley, PWS Publishing Company, 1994. In the JESS expert system, multiple inferences occur and are chained together to find a solution. Inferences can be chained in a forward manner or in a backward manner. In the preferred embodiment, forward chaining is used. With forward chaining, reasoning progresses from facts to conclusions about facts. Conclusions generally result in new facts based on other facts. In other word, facts cause rules to be fired (executed), which sets new facts, which in turn causes other rule to fire. The reasoning process continues until a conclusion results in a new fact that represents a solution.

In this embodiment the knowledge base contains the knowledge needed to troubleshoot a specific authentication system, the ACE/Server system that is produced by RSA Security (RSA) of Bedford, Mass. The knowledge base is developed by one experienced in the expert systems field. The developer obtains knowledge about troubleshooting the ACE/Server system and creates facts and rules base that represents that knowledge. The knowledge is extracted for instance, by interviewing domain experts, reading publications on the subject and from other sources. In this embodiment knowledge is extracted specifically from experts at solving authentication problems. Since without this invention solving authentication problems is a manual process, there are many experts available. From the knowledge extraction, the developer documents the list of facts and resolution strategies related to the problem. A resolution strategy is a specified way that a person finds a solution to a problem. The strategy may include breaking down a big problem into easily solvable smaller problems. Essentially it is a description of the path to a solution. Resolution strategies are used to develop the knowledge base. A resolution strategy may require many rules to be fired and many intermediate facts to be set before a solution is reached. Expert system facts are created by the developer from the list of facts documented during knowledge extraction. Expert system rules are created based on the resolution strategies. The strategies may define additional facts not in the original list of facts. The additional facts are also entered into the expert system.

Some rules are presented here for discussion. Actual rules have been simplified and translated to English as an aid to understanding for those not versed in the rules language used in the JESS expert system.

(1) If token:type is standard and the token:bad_PIN is yes
    Then SET user:PIN_guessing to yes
(2) If token:enabled is no and user:PIN_guessing is yes
    Then PRINT "Token was disabled by the ACE/Server due to PIN guessing. Clearing the counts will re-Enable the token and allow the user more tries."

The left-hand side (LHS) of rule (1) called the pattern, refers to fact token:type and fact token:bad_PIN. For simplification these are described here as separate facts, in the preferred embodiment these are implemented as one fact that has two slots (type and bad_PIN). These two facts (token:type and token:bad_PIN) represent actual information (state) in the ACE/Server database. Specifically the type of the token (token:type) and whether the user has improperly entered the PIN (token:bad_PIN). The constraints on the LHS indicate that for the rule to fire (execute) the token:type fact must equal to standard (a standard RSA token) and the token:bad_PIN fact must be equal to yes (the user has entered an incorrect PIN). If this is so, then the rule is fired and the right-hand side (RHS) action occurs, which in the case of rule (1) sets the user:PIN_guessing fact equal to yes. Thus a new fact related to the token problem is asserted. As stated previously, conclusions result in new facts based on other facts. The new fact is used to match other rule patterns and the matched rules will fire.

Rule (2) is one of the potential rules that can be fired based on the user:PIN_guessing fact, since this fact is in the rule's pattern. The token:enabled fact is also in the pattern. If token:enabled is no (token disabled) the pattern is satisfied, since user:PIN_guessing was set to yes when rule (1) fired. When rule (2) fires, information is printed that lets the service person know what has happened and how to fix it.

Rule (1) and rule (2) implement part of a resolution'strategy to first determine if there has been PIN guessing then determine the results of the PIN guessing. In this case, the token was disabled by the ACE/Server due to PIN guessing. The ACE/Server behaves in this way, because a hacker who has obtained a token will have to guess at PINs to try to break-in. In other words, the ACE/Server thinks there has been a break-in attempt.

Unfortunately, disabling the token also prevents legitimate users who have forgotten the PIN from getting system access. With the rules as implemented above, the service person is given enough information to fix the problem, however there is a chance that service personnel will be helping a hacker. Helping a hacker get access, is a security violation.

A simple rule change alleviates this problem. Rule (1) is changed to the following.

(3) If token:type is standard and the token:bad_PIN is yes Then SET user:pin_guessing to yes; PRINT "Advisory: The ACE/Server indicates there may have been some PIN guessing. This could mean the token is in the wrong hands. Be sure of who you are helping!!!"

This rule (3) now prints information that raises the security awareness of service personnel. The advisory message in this rule is presented to the troubleshooter in FIG. 13. Armed with this information the service person should verify whom they are helping and avoid helping an unauthorized user. Thus, the expert system is enhanced by adding security knowledge to the rule. The capability of the inference system in this invention to reason or infer about authentication security, reminds the troubleshooter about security. The enhancement improves the apparent skill level of servicing ACE/Server token problems. In order to assist token users properly and without the expert system to guide them, service personnel need to attain knowledge about the details of ACE/Server authentication state, operating features and possible security attacks.

To allow the JESS expert system to reason about the authentication state (as discussed in paragraphs above) and the troubleshooter answers (as discussed later), the state and answers are reflected in expert system facts. Example facts follow. These have been simplified as an aid to understanding.

Token:type (allowed-symbols standard soft pad) (4)

Token:enabled (allowed-symbols yes no) (5)

User_query:has_token (allowed-symbols yes no unknown) (6)

User_query:knows_pin (allowed-symbols yes no unknown) (7)

Facts (4) and (5) are facts that represent the authentication state of the problematic token obtained from the ACE/Server Database 304. The "allowed-symbols" phrase was included here to show the allowable settings for the fact. Fact token:type (4) represents the ACE/Server Database setting for type of token and fact token:enabled (5) represents the database setting for whether or not the token is enabled. Specifically these database settings are found in the ACE/Server SDToken table and are formally referred to as the iType field and the bEnabled field respectively. The database tables are published in RSA Security's ACE/Server documentation.

Facts (6) and (7) are facts that represent information obtained by asking questions. Fact $user_{13}query:has_{13}token$ (6) represents the answer to the question "Is the user in possession of the token?" $Fact_{13}user\_query:knows\_pin$ (7) represents the answer to the question "Does the user know the PIN?" The allowed-symbol unknown represents the fact's setting before the question has been asked. In other words the fact is unknown until the question is answered. Once question is answered only then does the associated fact get set to yes or no. A later discussion shows how a rule asks a question, obtains an answer and sets facts based on the answer. The sections above describe how basic knowledge is represented in the knowledge base and how the JESS expert system reasons using the rules and facts in the knowledge base to troubleshoot token problems.

To summarize, the JESS expert system reasons with facts that reflect the state of the authentication system, facts that reflect the answers to questions, facts that reflect the symptoms the user is experiencing, and intermediate facts that are part of a resolution strategy relevant to troubleshooting the authentication system. New facts are concluded by the expert system as it reasons until it finds a solution to the authentication problem.

In this invention the inference system reasons using the answers to troubleshooter question, among other things. The inference system initiates a question that is then answered by the troubleshooter. Initiation of a question occurs in rules. Rules create the text of the question and create the answer choices for the question. Questions are implemented as Java objects. FIG. 20 shows the actual rule 2001 that creates the question that is asked in the screen of FIG. 14. The first rules statement on the RHS of the rule is 2002. This statement establishes a reference to a Java question object. The reference '?*question*' is used to access the question object. Initially the question object is empty. The statement 2004 invokes the 'setKey' method of the question object with the argument string "ask-forgot-pin". Setting the key with a string, establishes an association between this question and the textual information that the troubleshooter sees on the screen 1402. This method of associating a key string with textual information is useful for supporting multiple national languages. The next statement 2006, invokes the question object's 'addResponseKey' method with argument "yes". This associates this question with textual information that represents a possible answer 1404. The "yes" key string is an association, not a direct representation of the text on the screen. Statement 2008 associates this question with the possible answer 1406. With the question text and possible answers established as content in the question object, statement 2010 invokes the question object's 'ask' method. This returns the question to the Web system 860 (FIG. 7) Java servlet. Using the contents of the question object displays the screen FIG. 14 to the troubleshooter. Statement 2010 does not finish until the question is answered. When the troubleshooter answers the question and presses the submit button 1408, the selected response 850 gets issued and the '?response' variable in 2010 gets set with the result. In statement 1212 the fact 'knowsPin' which represents whether the user knows the PIN, is set to the response. In other words the troubleshooter's answer is represented in the fact 'knowsPin'. The inference system can now reason with this new information as it searches for a solution. FIGS. 21A–P provide a complete listing of the rules used in a presently-preferred embodiment.

Figure 5:
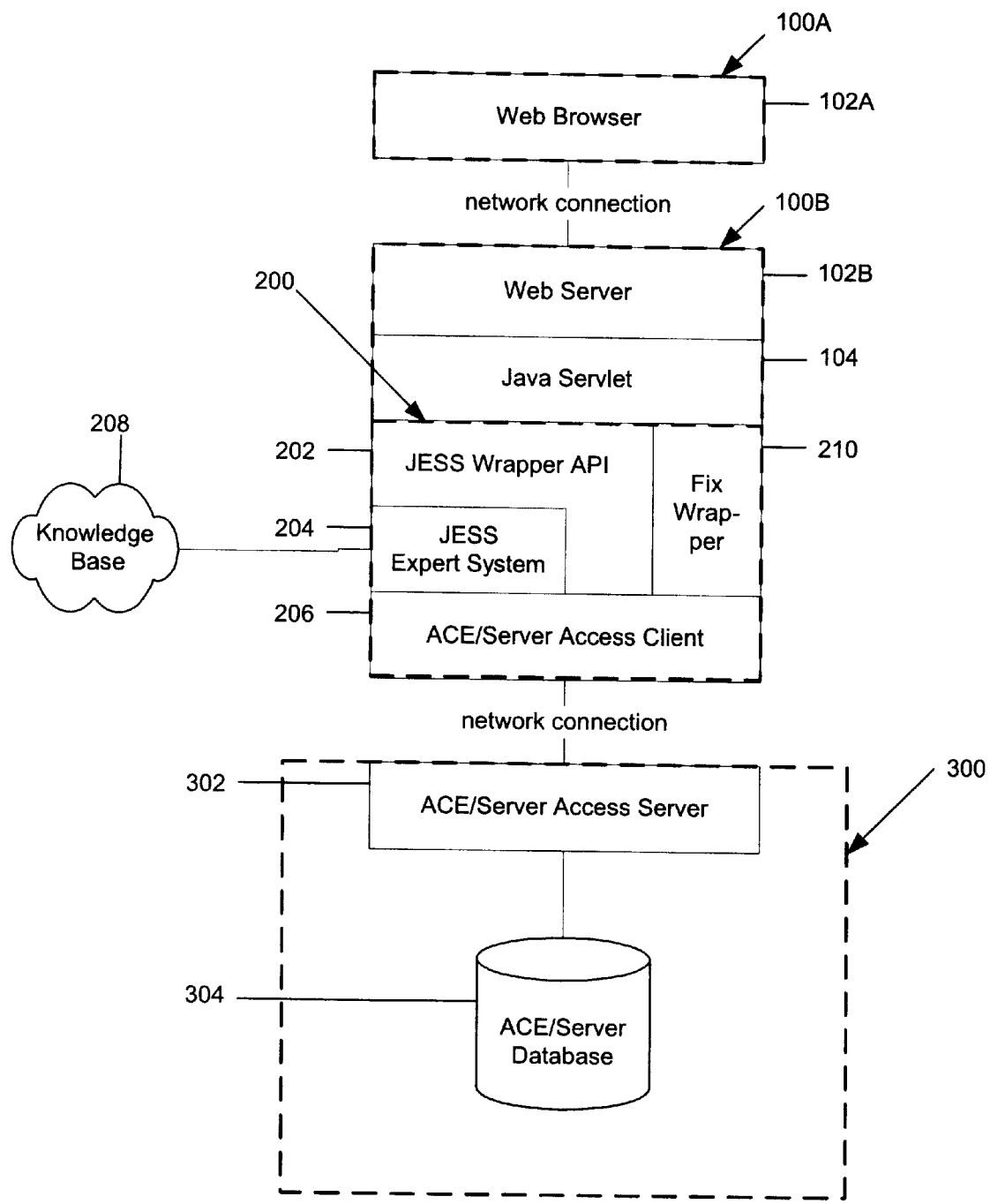
FIG. 5 is a diagram of the software layers in the preferred embodiment that shows the network connections.
Figure 7:
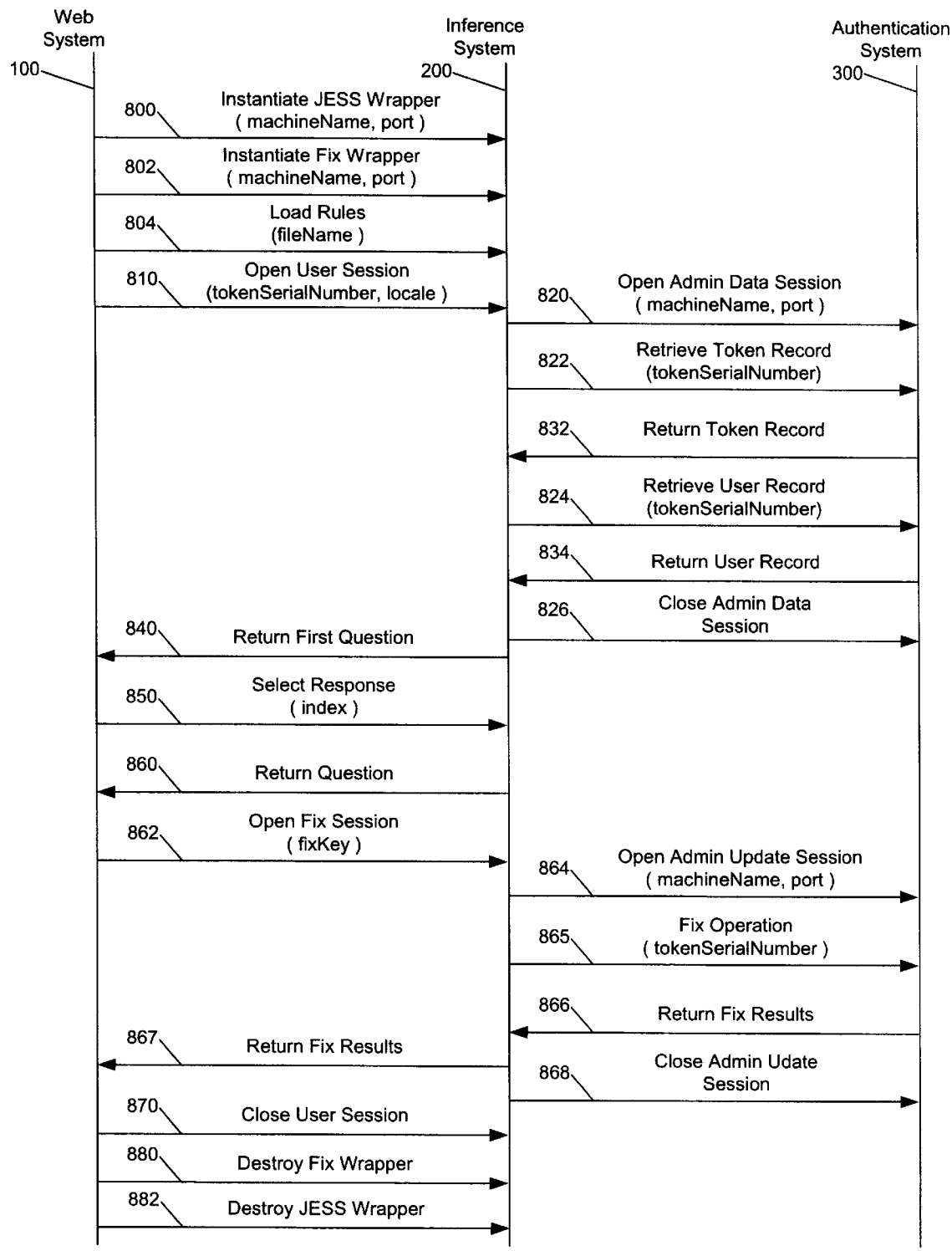
FIG. 7 is a diagram illustrating, the information and sequence that pass between the inference system, the Web system, and the authentication system in the preferred embodiment.

The discussion below is concerned with how the system components operate together during a token troubleshooting session. The term Java object could be used instead of component. However, component will continue to be used for continuity. The discussion will follow the approximate sequence of a troubleshooting session. The sequence is shown in FIG. 7. However first a discussion of the network topology of the system is in order. The connection between the web browser and the web server is, of course, a network connection. In this embodiment FIG. 5, the Web server and Web servlet 100B reside on the same physical machine as the other inference system components 200. This means that the Web browser 100A resides on a remote machine that communicates across the network to the machine that contains the Web server and the other components (100B and 200). Put another way the Web system 100 is split across two machines that communicate via the network, the Web browser machine 100A and the machine that contains the remaining components 100B. For convenience we will call the machine that contains the components 100B and 200 the 'inference server.'

Figure 8:
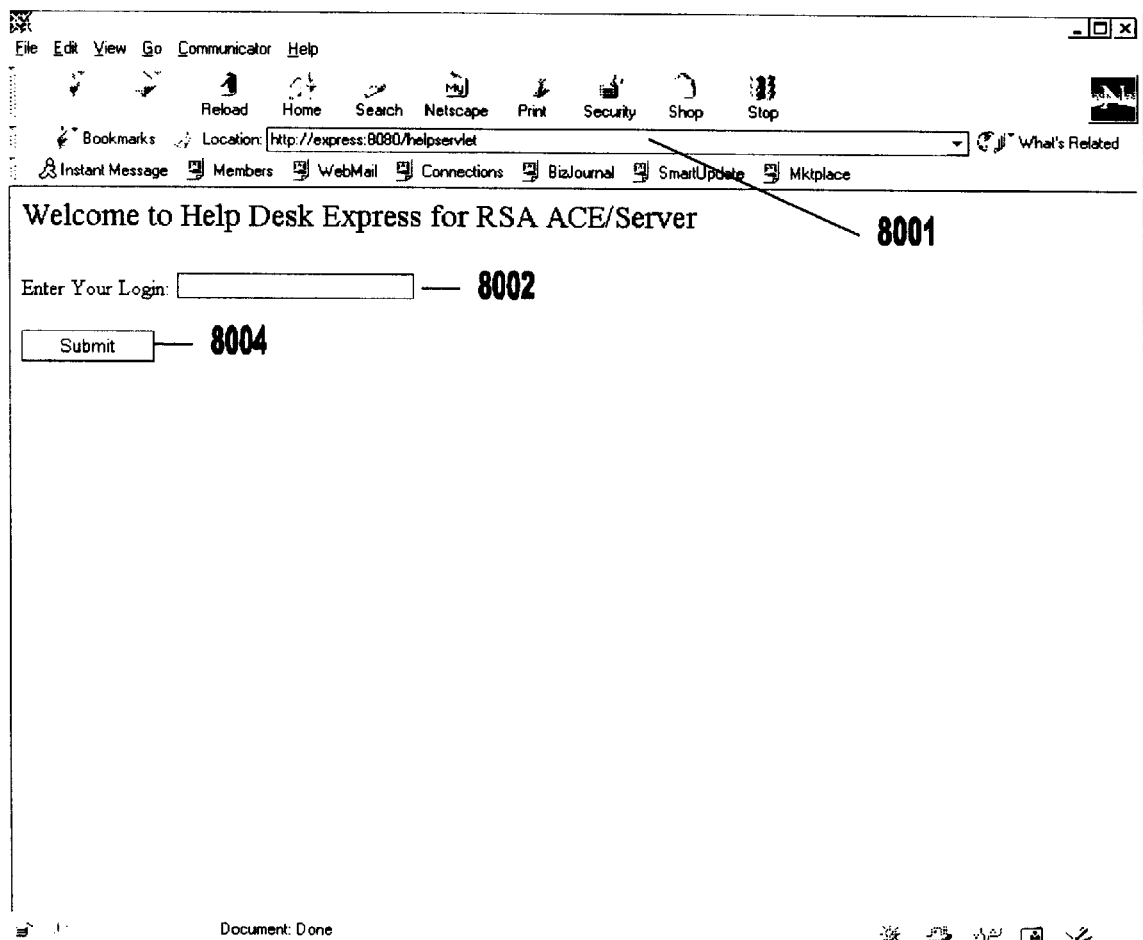
FIG. 8 and FIG. 9 are the troubleshooter login screens.
Figure 9:
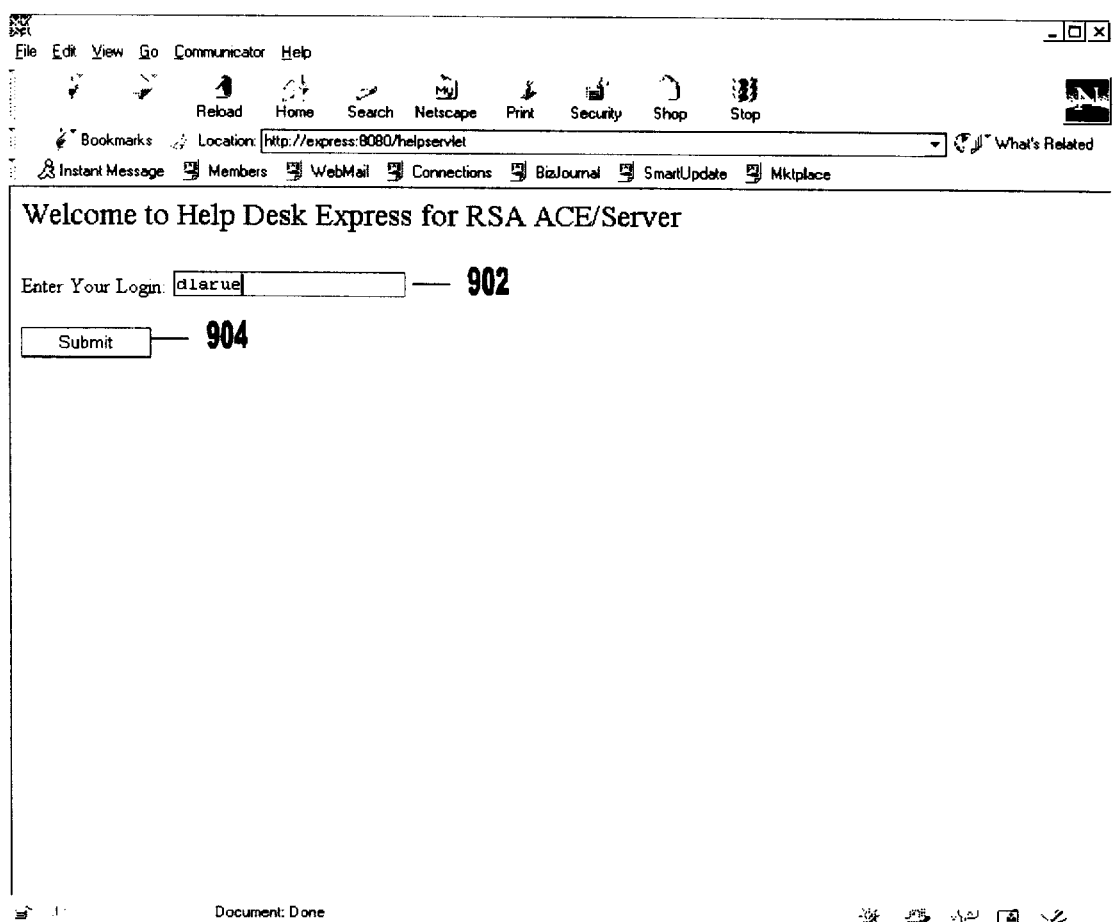

In the preferred embodiment a troubleshooter who wishes to troubleshoot token authentication system problems, starts an interactive session via the Web system. The troubleshooter does this on the web browser 102 (FIG. 4) by entering the web address (URL) 8001 (FIG. 8) of the web server 106 and Java servlet 104 along with his or her login 8002 and then clicking on submit 8004. The web server is configured to start the Java servlet 104 when the that is done. The address is arbitrary and an administration detail not relevant to this invention. If the servlet detects that the session is new, it presents the troubleshooter with a login screen FIG. 9. The troubleshooter is authenticated to be sure they are authorized to access the inference system. This invention requires the troubleshooter to authenticate using a token. The troubleshooter enters the user ID in 902 and presses the submit button 904.

Figure 10:
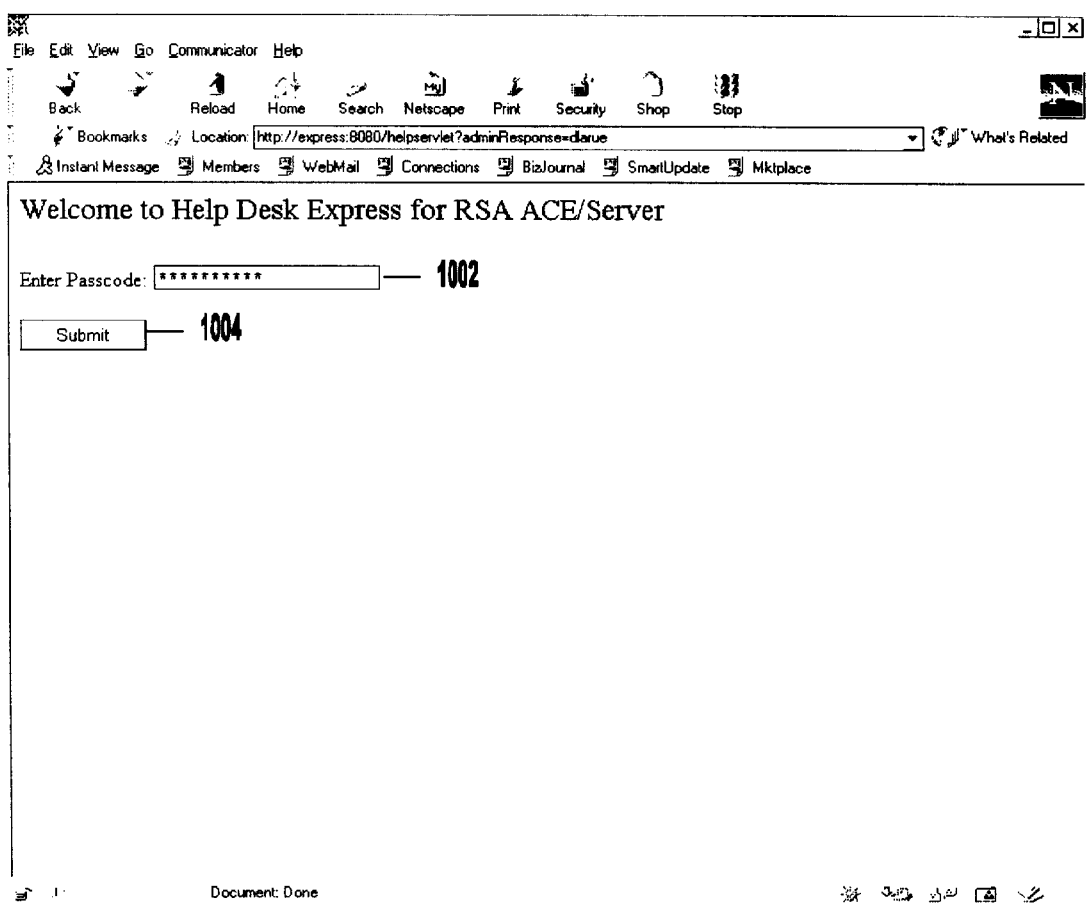
FIG. 10 is the troubleshooter passcode entry screen.

If the user ID is correct, the servlet then presents the passcode entry screen FIG. 10. The troubleshooter then enters the authentication passcode in 1002 and presses submit button 1004. If the passcode is correct then the servlet continues processing. If the user ID or passcode is incorrect then the servlet does not proceed. Upon proceeding the Java servlet instantiates (creates) the JESS wrapper 800 (FIG. 7) and instantiates the fix wrapper 802. Once created, these components (JESS wrapper 202 and fix wrapper 208, FIG. 4) create the other components that make up the inference system. These components are the JESS expert system 204, ACE/Server access client 206 and other transient components not critical to this discussion.

Once the JESS wrapper is created, the servlet uses JESS wrapper methods, functions that make up the API used to communicate with the inference system 200. The first method the Java servlet uses is the load rules method 804 i.e. sends the load rules message to the inference system. The terms method, send message or send information can be synonymously. Messages may have arguments. The arguments are annotated in parentheses, FIG. 7. For example, the load rules message includes a fileName argument. The argument is the name of the file that contains the rules to load. The JESS wrapper receives the load rules message and argument, then sends a message (internal to the inference system) to the JESS expert system 204. The messages internal to the systems 100, 200 and 300 are not required to understand the invention and are therefore not discussed. The JESS expert system receives the load rules message and loads the rules. These rules are the rules needed for the inference engine to solve authentication problems as discussed earlier.

Figure 11:
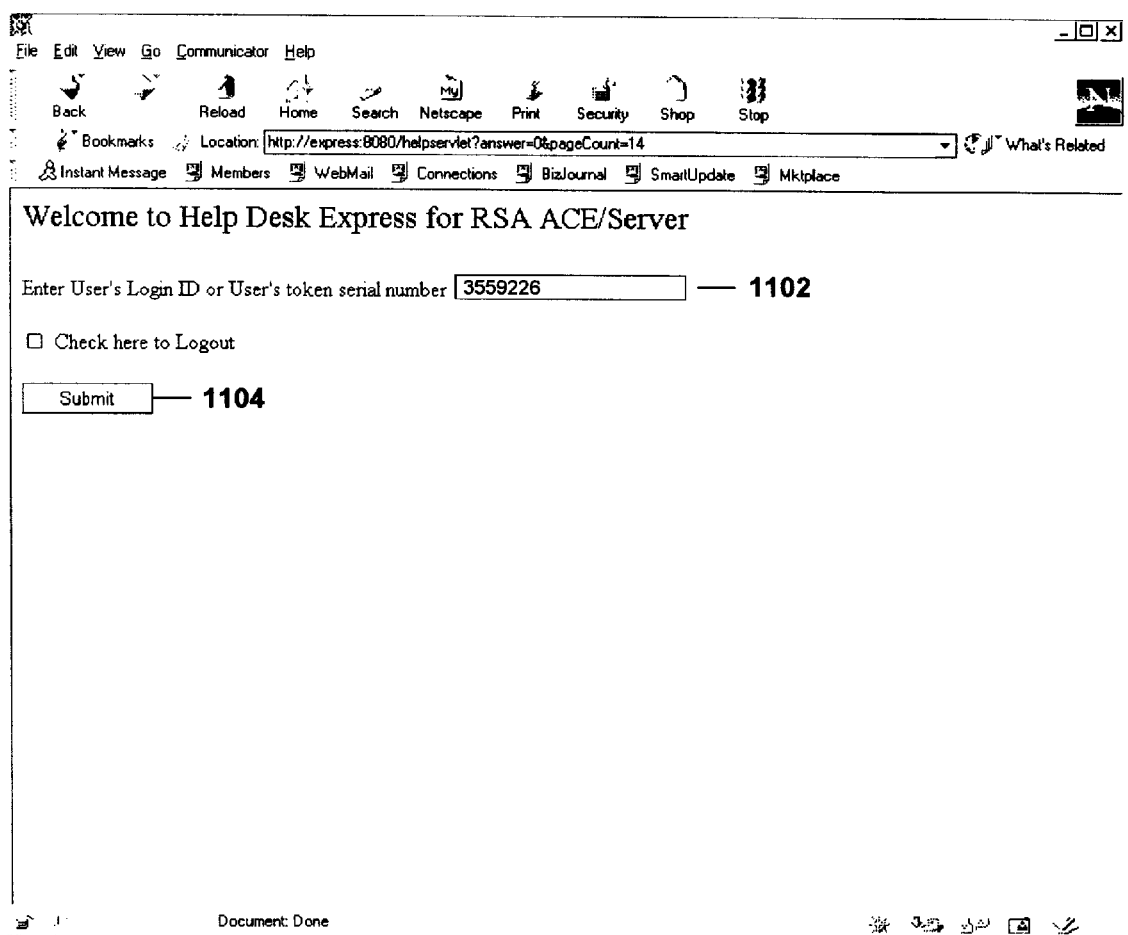
FIG. 11 is the user entry screen with token serial number entered.

Once the inference system rules are loaded, the inference system is ready to process individual user (troubleshooting) sessions. The user entry screen is shown in FIG. 11. To start a user session, the troubleshooter uses the web browser and enters unique information about the user or the token having the problem. The unique information is usually the token's serial number 1102 (FIG. 11) and clicks on submit button 1104. The unique information can also be the login identity (login ID) of the user having the problem, though only the token serial number is considered here. The servlet sends the open user session message 810 to the inference system. Accompanying this message are a tokenSerialNumber argument that uniquely identifies the token with the problem and a locale argument used for national language localization. Locale is used to allow the troubleshooter to select the language that is displayed during the user session. The details of national language localization are not essential to this discussion.

As a result of the open user session message the inference system prepares to set the expert system facts in the JESS expert system to reflect the actual state in the ACE/Server database 304. This is done with a query to the ACE/Server Database using unique information. For example, the tokenSerialNumber is used as the database query key. To begin the query the inference system sends an open admin data session message 820 via the ACE/Server access client 206 to the authentication system 300. The arguments included with the open admin data session message are machineName used to select the specific authentication system and 'port' used to select the specific service on the authentication system that is provided by the ACE/Server access server 302. In short, the ACE/Server access client 206 (FIG. 5) has connected to the ACE/Server access server 302 via the network using the internet protocol (IP). The client 206 and server 302 use a computer platform independent, computer language independent date exchange protocol, that includes a trust model and data encryption. Security between the inference system and the authentication system is an important aspect of this invention.

The server is written in the C computer language. The server software can be ported to (compiled and run on) many computer platforms. This allows the server to be used with slight modifications on other authentication systems. The inference system can thus be more easily adapted to troubleshoot authentication systems other than the ACE/Server system. The authentication system 300 is resident on a machine separate from the inference system. The authentication system is running the commercially available ACE/Server version 3.3.1 product of RSA Security. The machine also runs the ACE/Server access server 302 of this invention. Once admin data session 820 is open, the inference system JESS wrapper can send a message to query the ACE/Server database 304.

The capability of the inference system in this invention to automatically query the ACE/Server database, relieves the troubleshooter from having to do this manually. The retrieve token record message 822 instructs the ACE/Server access server to query the database using the token serial number argument as the query key. When the ACE/Server database has completed the query, the ACE/Server access server returns the token record 832 via the ACE/Server access client to the JESS wrapper. The JESS wrapper converts the token record to token facts and loads the facts into the knowledge base 208. A similar query and conversion is performed for the user record at 824, 834. Thereupon, close admin data session message 826 is sent, ending the admin data session.

The JESS wrapper can also set facts by accessing information it has save during prior sessions. This allows the JESS expert system to know about prior attempts to fix a problem. With the rules loaded and facts loaded into the knowledge base 208, the JESS expert system has all it needed to begin reasoning. The JESS wrapper sends an internal message to the JESS expert system to start reasoning. The capability of the inference system in this invention to reason or infer about authentication troubleshooting relieves the troubleshooter from having to reason about the detailed authentication problems. The JESS expert system fires rules and sets facts until it determines that a question should be asked. The first question 840 is returned to the Web system. This question is the returned results from the open user session 810 that occurred earlier.

Figure 12:
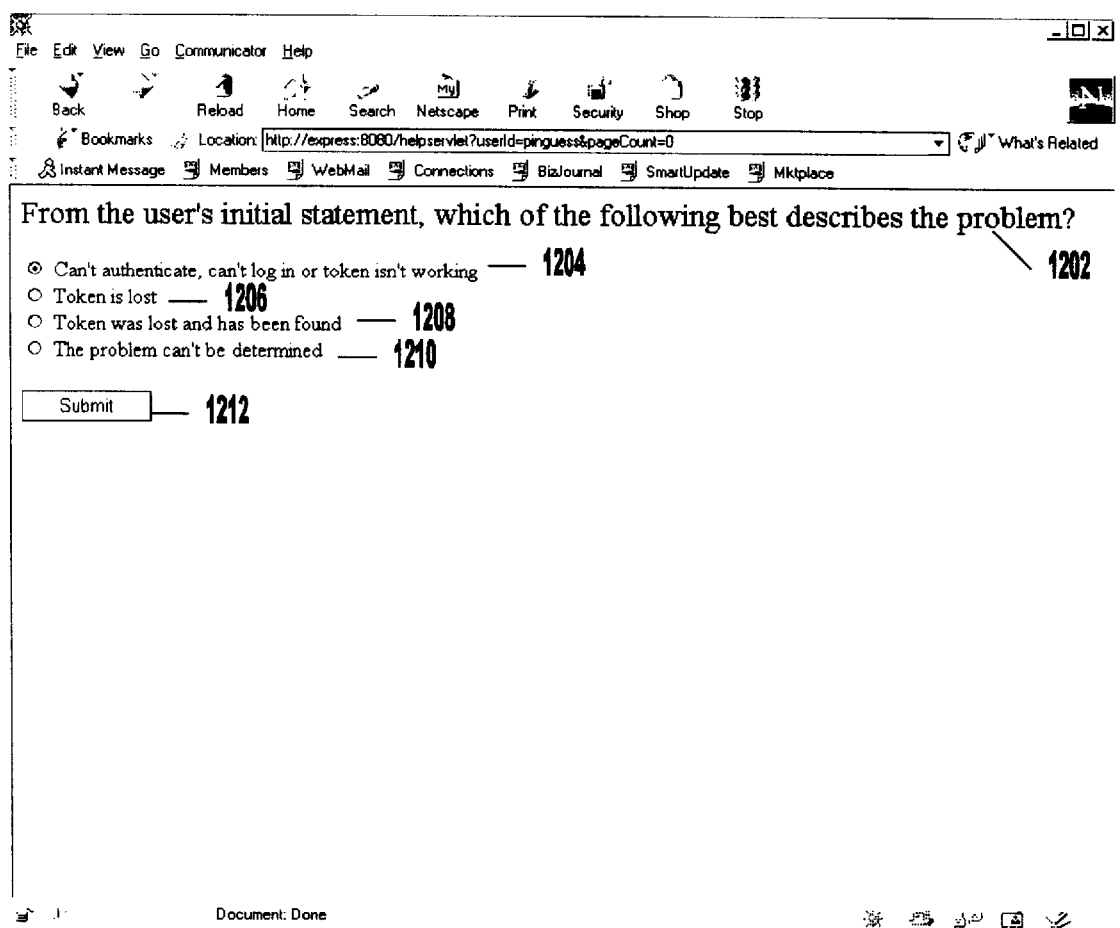
FIG. 12 is the user initial entry (first question) screen.

In this embodiment, the first question is concerned with the general nature of the authentication problem, as shown in FIG. 12. This is part of a resolution strategy to reason from general to the specific. Questions returned by the inference system are implemented as Java objects that contain text and the possible answers to those questions. The Java servlet 104 (FIG. 4) uses the contents to the question object to create an html page (screen) that is displayed to the troubleshooter via the Web server and Web browser. The troubleshooter then selects the appropriate answer 1204 (FIG. 12). Some questions present advisory information to the troubleshooter (FIG. 13). This type of question has zero or one answers. The Java servlet sends the select response message 850 (FIG. 7) to the inference system's JESS wrapper, which forwards the response to the JESS expert system.

The JESS expert system then continues reasoning with a fact set to reflect the answer to the question. When the JESS expert system determines that another question should be asked, a new question is returned 860 from the earlier selected response and displayed by the servlet FIG. 14. The troubleshooter answers the question 1404 (FIG. 14) and a new select response message is sent to the inference system. The select-response/return-question (850/860) cycle occurs zero to many times as determined by the JESS expert system. In short the troubleshooter gets asked questions and the expert system reasons about the answers to find a solution to the authentication problem.

The question object has state that indicates if it contains a fix. The JESS expert system sets the question to contain a fixKey when it has found a fix to the authentication problem. Fixes are not limited to one. One to many fixes may occur for a particular problem as determined by the JESS expert system. When a fix does occur, the troubleshooter can select 1504 (FIG. 15) that a fix session can be opened 862. The purpose of a fix session is to remedy the problem automatically so that the troubleshooter has only to allow or disallow the fix. This relieves the troubleshooter from having to perform manual fix operations and eliminates mistakes that could be made during manual fix operations. The Java servlet obtains the fixKey from the question and sends the open fix session message and the fixKey argument 862 to the fix wrapper 210. The fix wrapper uses the fixKey to lookup fix operation(s) to be performed. The fix operations can provide information to the troubleshooter, such as instructions to inform the user of a mistake they have made. The information to the troubleshooter is send in the return fix results message 867 sent by the fix wrapper.

The fix operations can also remedy problems in the ACE/Server Database (authentication state). In this case, the fix wrapper sends an open admin update session 864 via the ACE/Server access client 302 to the authentication system ACE/Server access server. As with the open admin data session 820 above the open admin update session creates a network connection from the inference system to the authentication system. Based on the fixKey the fix wrapper with send the appropriate fix operation message 865 and argument to the authentication system. The authentication system sends return fix results 866 to the inference system fix wrapper in response to the fix operation message. The fix wrapper sends return fix result 867 to the Web system Java servlet. The fixKey is used by the fix wrapper to lookup one or more fix operations. When all the fix operations have be accomplished the fix wrapper will send the close admin update session message 868.

To recap, select-response/return-question (850/860) cycles and fix sessions (862, 864, 865, 866, 867, 868) can occur zero to many times during a user session. The select-response/return-question cycle ends when a special solution question is returned. The question object has state that indicates if it contains a solution. The JESS expert system sets the question to contain a solution when it has determined that the authentication system problem has been solved or reasoning cannot continue. The JESS expert system stops reasoning when a solution has been determined. Only one solution occurs per user session, which starts with the open user session message 810. When a solution is indicated the Java servlet 104 displays the solution to the troubleshooter (FIG. 16) and upon confirmation the servlet sends the close user session message to the inference system JESS wrapper 202. The servlet then displays a screen that allows the troubleshooter to open the next user session (FIG. 17). Zero to many user sessions can occur. When the troubleshooter no longer needs access to the inference system (i.e. no longer needs to open user sessions) the troubleshooter can select logout (870) and the Java servlet will destroy the fix wrapper (880) and the JESS wrapper (882). Destroying the JESS wrapper will also automatically destroy the JESS expert system and the ACE/Server access client. The ACE/Server access server though disconnected from the ACE/Server access client, is not destroyed and remains running ready to service any ACE/Server access clients that request service.

In this embodiment, many troubleshooters can each use one instance of a Web browser 102 and connect to the Web Server 106. Only one instance of the Java servlet 104 exists. However, through the session management capabilities of the Java servlet, an instance of the inference system 200 (JESS wrapper 202, fix wrapper 210, JESS expert system 204 and the ACE/Server access client 206) is created for each troubleshooter that connects to the Web server. Troubleshooters and inference systems have a one-to-one association. Each inference system connects to only one authentication system 300.

In this embodiment, the Java Servlet 104 conforms to the Java Servlet Version 2.0 API as published by Sun Microsystems Web site ://java.sun.com/products/servlet/index.html. Details of Java servlet programming can be found in "Java Servlet Programming" by Jason Hunter, O'Reilly & Associates, Inc., 1998. The Web server 106 and the Web browser 102 are commercial off-the-shelf products.

The Web server supports servlets, supports SSL encryption to the browser, and is configured to run the Java servlet in this embodiment. The ACE/Server access server 302 accesses the ACE/Server database 304 using the ACE/Server Administration Toolkit API and the ESQL query language as provided by RSA Security.

Conclusion

The foregoing Detailed Description has disclosed to those skilled in the art of troubleshooting user authentication subsystems of the type that employ a complex user authentication technique how to make and use interactive troubleshooting apparatus that greatly simplifies the troubleshooting of such systems. The Detailed Description has moreover disclosed the best mode presently known to the inventor of practicing his invention. It will, however, be immediately apparent to those skilled in the arts of user authentication and troubleshooting that many other troubleshooting systems that employ the principles of the one disclosed herein may be built and used. For example, the troubleshooting system disclosed herein is used in an authentication system that employs tokens; the principles of the invention can, however, be used to make a troubleshooting system for any authentication system that involves complex authentication state. The details of such a troubleshooting system will necessarily be determined by the kind of authentication system. Further, the system disclosed herein employs a knowledge base to do its inferencing; other troubleshooting systems that operate according to the principles of this invention may employ other techniques, for example, neural networks, to do the inferencing. Finally, at the level of implementation, the exact forms of rules will be determined not only by the particular authentication system the troubleshooting system is being used with, but also by the particular knowledge base system being used. The same is true for the precise form of the user interface, which will be determined by the particular authentication system and the kind of interactive user interface that is being employed.

For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. Troubleshooting apparatus that is used from an interactive interface to troubleshoot a user authentication subsystem that employs a token having an identifier, the apparatus comprising:

an authentication information database in the user authentication subsystem that responds to a query concerning the user authentication subsystem; and an authentication problem solving system that includes an inferencer, the problem solving system responding to an input of the indentifier from the interactive interface by providing a query to the authentication information database and responding to a query result of the query by providing the query result to the inferencer and an output based on an inferencer result to the interactive interface.

2. The apparatus set forth in claim 1 wherein:

the output to the interactive interface is or includes a security warning.

3. The apparatus set forth in claim 1 wherein:

the authentication problem solving system further provides a query specifying a modification to the authentication information database, the provision of the query specifying the modification involving another inferencer result.

4. The apparatus set forth in claim 3 wherein:

the authentication problem solving system further provides an indication of the modification to the interactive interface and provides the query specifying the modification to the authentication information database in response to an input from the interactive interface.

5. The apparatus set forth in any one of claims 1 through 4 wherein:

the inferencer includes a knowledge base including one or more rules and one or more facts, a rule being fired in response to a fact, the fact being contained in the knowledge base, having been received from an input from the interactive interface, and/or having been received in a result of a query, and the inferencer result being based on the firing of the rule.

6. Troubleshooting apparatus that is used from an interactive interface to troubleshoot a user authentication problem in a user authentication subsystem that employs a user authentication technique, the user authentication technique providing no direct mapping from an authentication state of a plurality thereof to a solution for the problem and the apparatus comprising:

an authentication information database in the user authentication subsystem that contains authentication state information about the authentication states and produces a query result in response to a query; and an authentication problem solving system that responds to an input from the interactive interface by providing a query to the authentication information database and responds to a query result by providing an output to the interactive interface, the authentication problem solving system further including an inferencer for the authentication technique and the authentication problem solving system providing an input to and receiving a result from the inferencer and using the inferencer result to provide the query and/or the output.

7. The apparatus set forth in claim 6 wherein:

the output to the interactive interface is or includes a security warning related to the user authentication technique.

8. The apparatus set forth in claim 6 wherein:

the authentication problem solving system further provides a query specifying a modification to the authentication information database, the provision of the query specifying the modification involving the use of the inferencer result.

9. The apparatus set forth in claim 8 wherein:

the authentication problem solving system further provides an indication of the modification to the interactive interface and provides the query specifying the modification to the authentication information database in response to an input from the interactive interface.

10. The apparatus set forth in any one of claims 6 through 9 wherein:

the inferencer includes a knowledge base including one or more rules and one or more facts concerning the authentication technique, a rule being fired in response to a fact, the fact being contained in the knowledge base, having been received from an input from the interactive interface, and/or having been received in a result of a query, and the inferencer result being based on the firing of the rule.

11. The apparatus set forth in claim 10 wherein:

the authentication problem solving system provides the output to the interactive interface in response to a firing of one or more of the rules.

12. The apparatus set forth in any one of claims 6 through 9 wherein:

the user authentication technique involves a token that the user uses to authenticate himself to the user authentication subsystem.

13. The apparatus set forth in claim 12 wherein:

an identifier is associated with the token;

the authentication information database returns authentication state associated with the token in the database in response to the identifier;

the input from the interactive interface is the identifier; and the problem solving system provides the returned authentication state as an input to the inferencer.

* * * * *